(12) United States Patent
Diemer et al.

(10) Patent No.: US 8,220,641 B2
(45) Date of Patent: *Jul. 17, 2012

(54) FILTER MODULE AND PROCESS FOR MANUFACTURE OF SAME

(75) Inventors: Wolfgang Diemer, Waldstatten (DE); Martin Zeiler, Schwaebisch Gmuend (DE)

(73) Assignee: Pall Corporation, Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/070,549

(22) Filed: Mar. 24, 2011

(65) Prior Publication Data

US 2011/0174725 A1    Jul. 21, 2011

Related U.S. Application Data

(63) Continuation of application No. 11/995,209, filed as application No. PCT/EP2006/007368 on Jul. 26, 2006, now Pat. No. 7,934,605.

(60) Provisional application No. 60/702,985, filed on Jul. 28, 2005.

(51) Int. Cl.
*B01D 27/00* (2006.01)
*B01D 29/07* (2006.01)
*B01D 35/28* (2006.01)

(52) U.S. Cl. ............... 210/494.1; 210/494.3; 210/497.1; 210/435; 210/437; 210/457

(58) Field of Classification Search .................. None
See application file for complete search history.

(56) References Cited

U.S. PATENT DOCUMENTS

| 1,792,797 A | * | 2/1931 | Armstrong ................. 210/494.1 |
| 2005/0155923 A1 | * | 7/2005 | Diemer et al. ................. 210/345 |

FOREIGN PATENT DOCUMENTS

WO    WO 03/041829 A2 *    5/2003

OTHER PUBLICATIONS

U.S. Appl. No. 10/844,585, filed May 13, 2004.
U.S. Appl. No. 11/995,207, filed Jan. 10, 2008.
U.S. Appl. No. 11/995,211, filed Feb. 25, 2008.
U.S. Appl. No. 12/526,533, filed Aug. 10, 2009.
U.S. Appl. No. 12/526,536, filed Aug. 10, 2009.
U.S. Appl. No. 12/526,539, filed Aug. 10, 2009.
European Patent Office, PCT/EP206/007368, Sep. 20, 2006.
U.S. Appl. No. 11/995,209, filed Jan. 10, 2008.

* cited by examiner

*Primary Examiner* — Benjamin Kurtz
(74) *Attorney, Agent, or Firm* — Leydig, Voit & Mayer, Ltd.

(57) ABSTRACT

A filter module comprises a body of wound layers of a sheet material, said body having inner and outer peripheral surfaces, a winding axis and a passage along the winding axis and in fluid communication with the inner peripheral surface, the sheet material having openings forming two channel types from the inner to the outer peripheral surfaces, a first channel type open at the outer peripheral surface and closed adjacent to the inner peripheral surface, a second channel type open at the inner peripheral surface, in fluid communication with the passage and closed adjacent to the outer peripheral surface, the two channel types separated from each other by sheet material, one channel type being inlet channels communicating with an inlet, the other channel type being outlet channels communicating with an outlet, the edge of the inlet channel openings having a thickness less than the thickness remote from those openings.

71 Claims, 11 Drawing Sheets

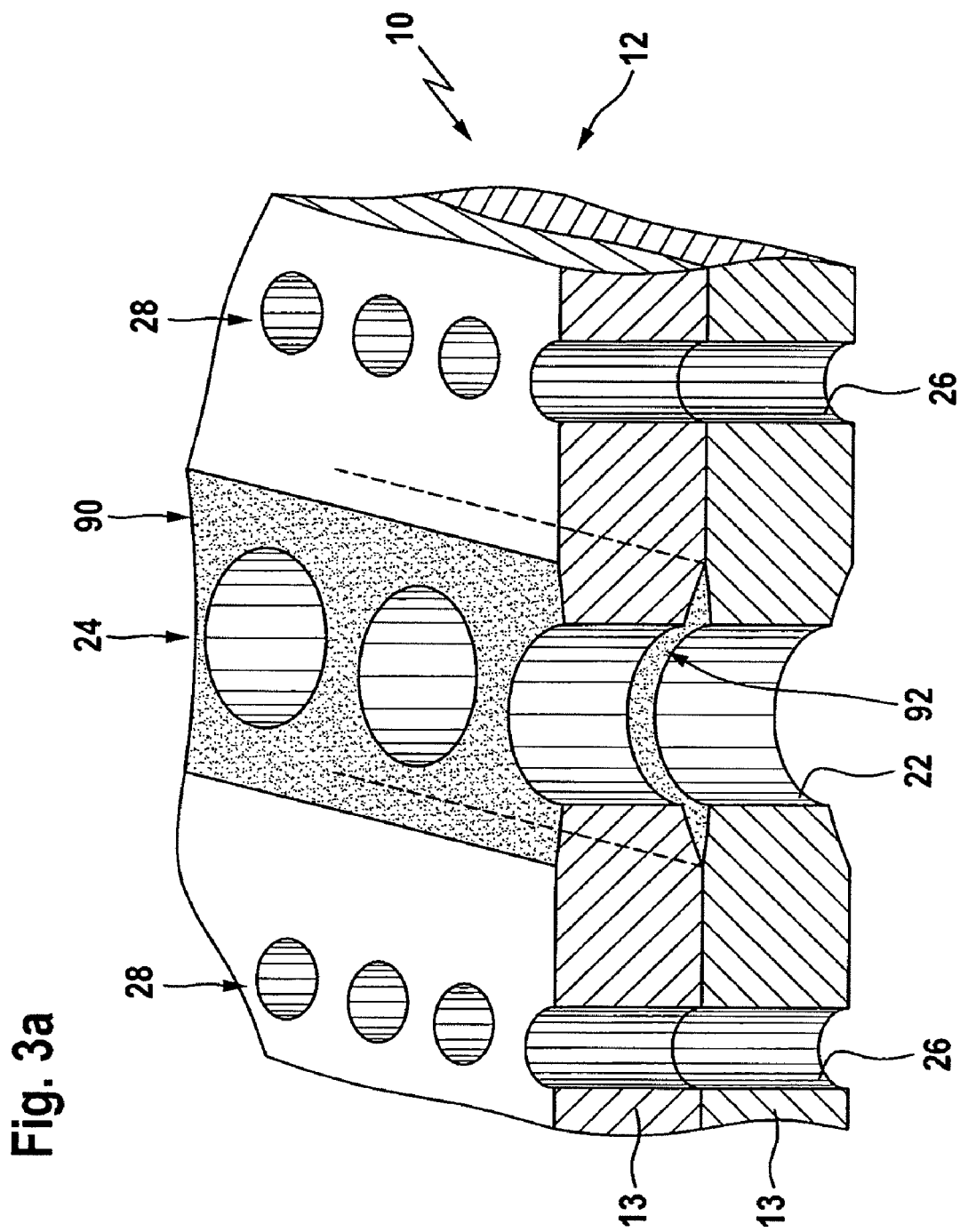

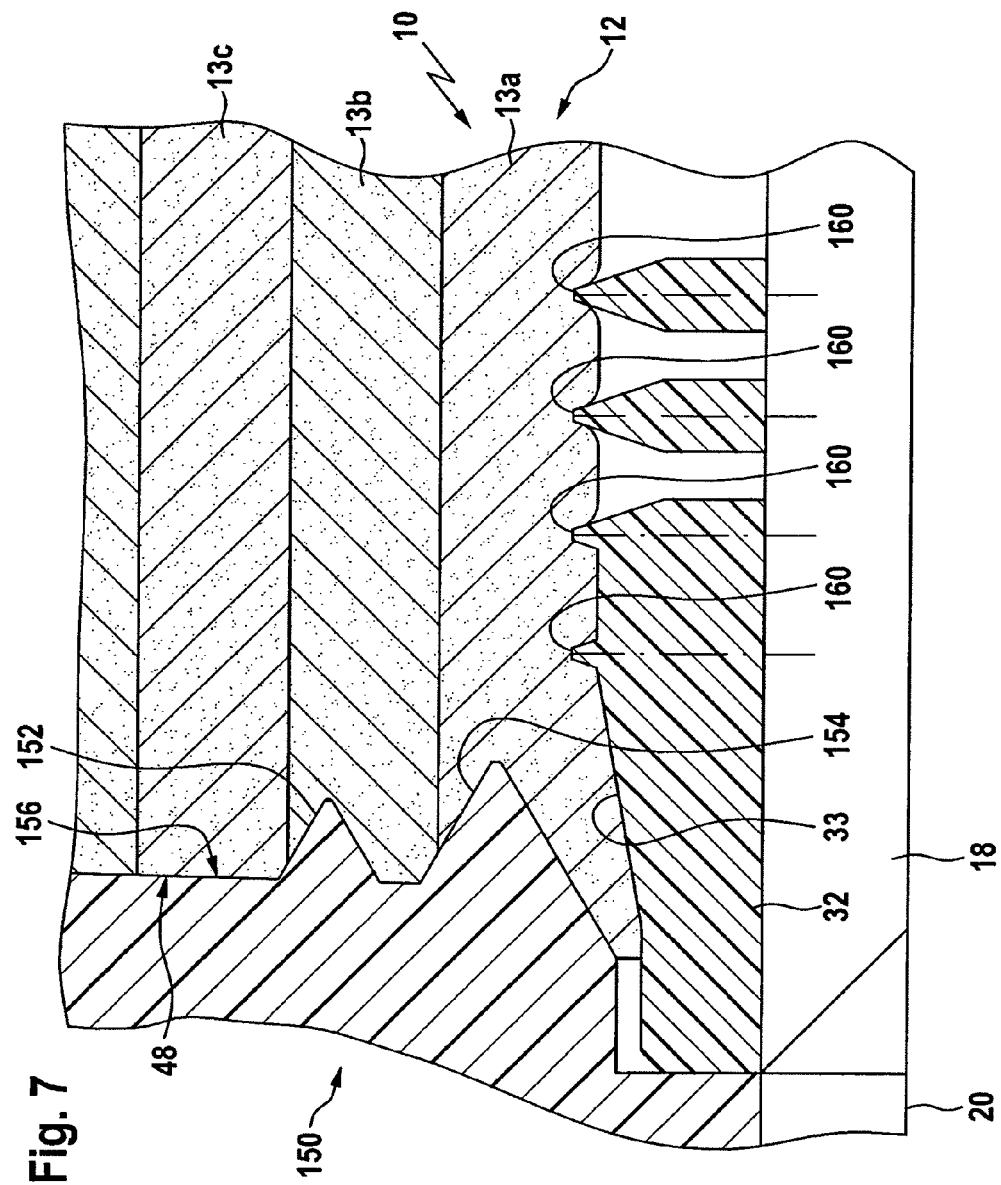

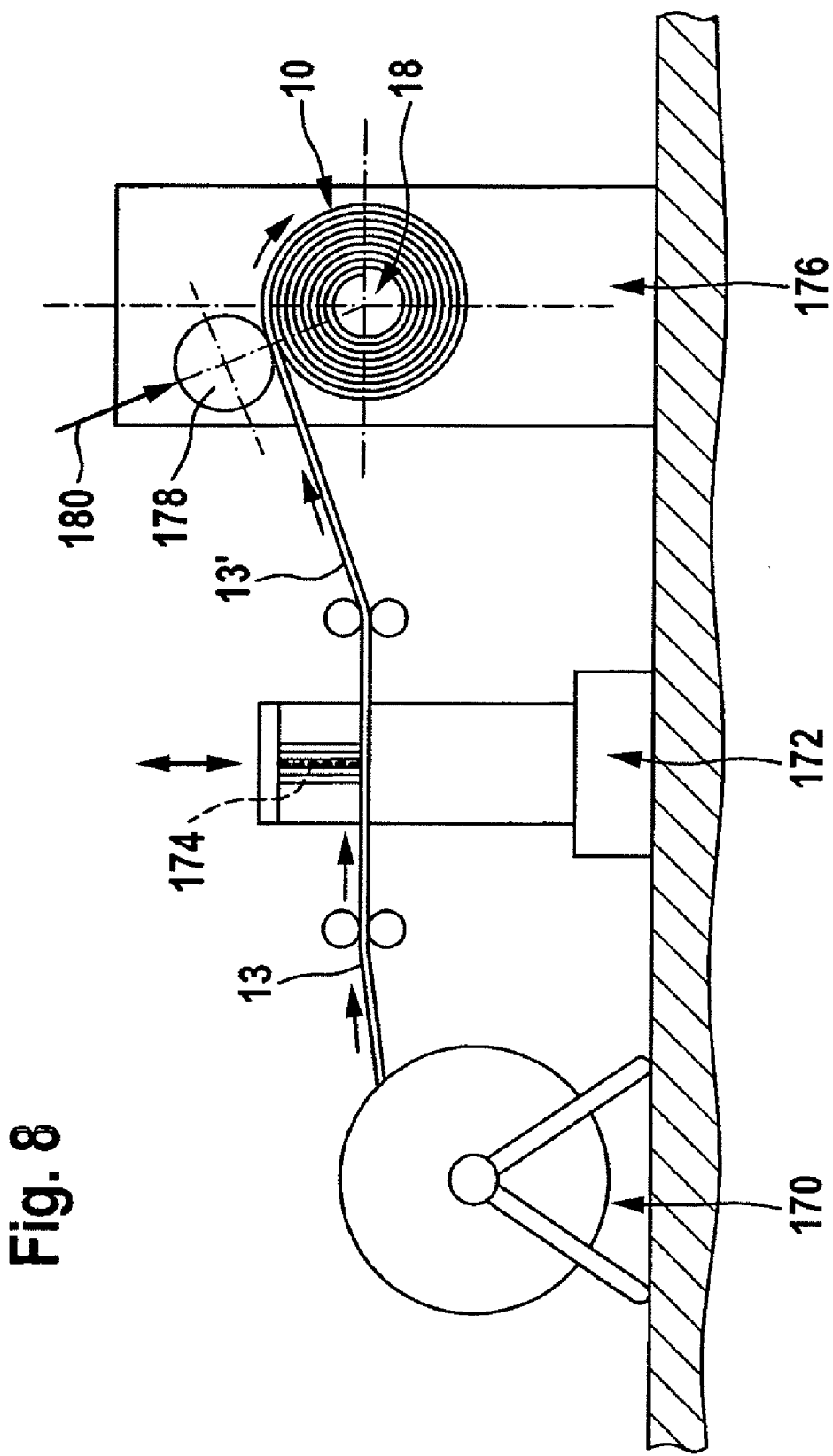

FILTER MODULE AND PROCESS FOR MANUFACTURE OF SAME

Figure 1:
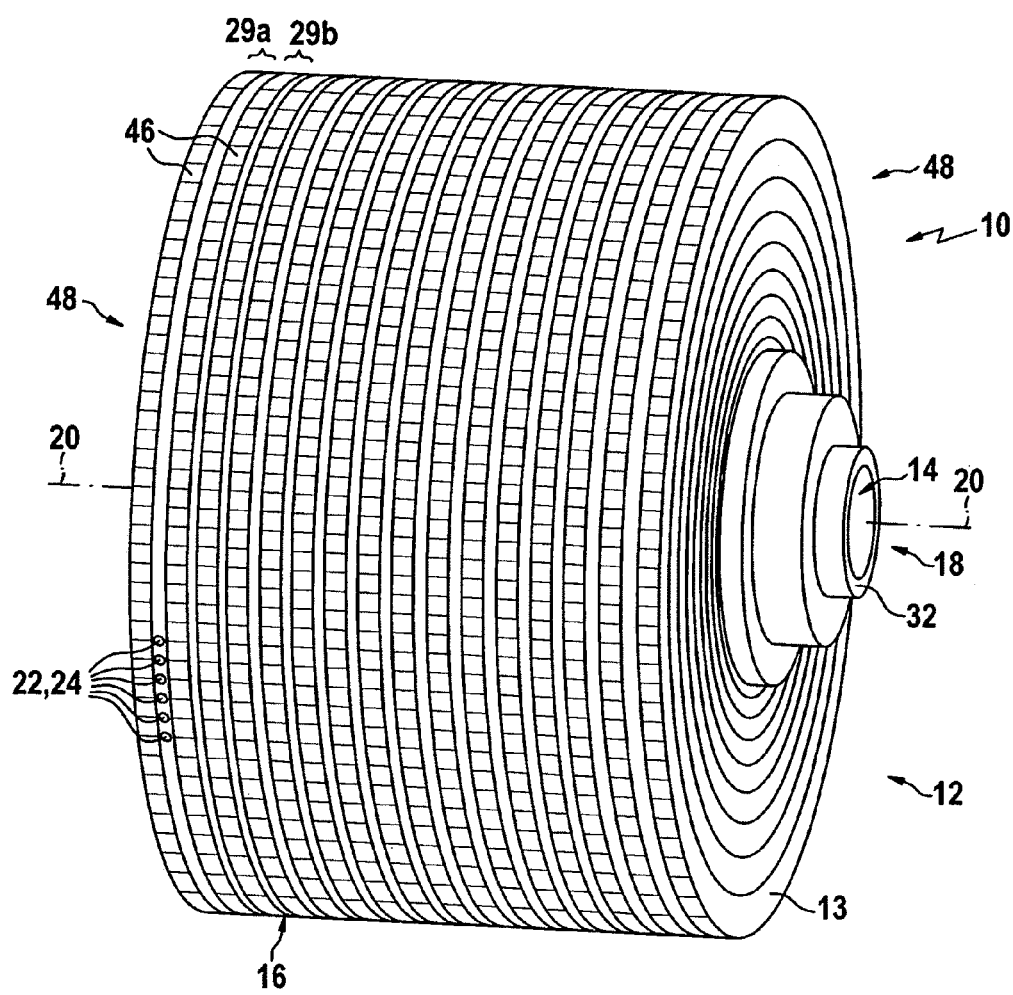

The present invention relates to a filter module and a process for manufacture of same.

The filter module according to the present invention comprises a body of wound layers of a sheet material, said body having an inner and an outer peripheral surface, a winding axis and a passage extending along the winding access of said body and in fluid communication with said inner peripheral surface. The sheet material has a plurality of openings formed therein, said openings forming at least two types of channels within the wound layers of sheet material of said body, said channels extending in a direction from the inner peripheral surface to the outer peripheral surface.

A first type of channel formed in said body is open at one end at the outer peripheral surface of the body and closed at the other end located adjacent to the inner peripheral surface. A second type of channel is open at one end at the inner peripheral surface of the body and in fluid communication with said passage and closed at the other end located adjacent to the outer peripheral surface.

The different types of channels are separated from one another by portions of sheet material such that fluid to be filtered and entering one type of channels may reach the other type of channel and exit the filter module only by migrating through a portion of said body formed by the sheet material separating these different types of channels.

One type of channel is communicating with a fluid inlet of said filter module. Channels of this type are called in the following inlet channels; another type of channels is communicating with an outlet of said filter module and these channels are called in the following outlet channels.

Filter modules of this type are generally known, for example, from the PCT application WO 03/041829 A2.

Another filter module of this type is known, for example, from U.S. Pat. No. 2,339,703.

While the filter modules as mentioned above provide an interesting approach to a filter module of filter paper (U.S. Pat. No. 2,339,703) and other filter materials (WO 03/041829), they have been found ineffective in a number of aspects.

The object of the present invention is to provide an improved filter module of the above-described type which provides a longer service life for the filter modules by simple and cost effective means.

This object is achieved by a filter module according to claim 1.

In its simplest configuration the body of the filter module may have one inlet and one outlet channel. For practical purposes, in most applications, however, the body of the filter module will have both a plurality of inlet and outlet channels. The following explanations of the present invention refer to configurations with a plurality of channels. However, these explanations will mostly apply also to the afore-mentioned simplest configuration.

According to a first aspect of the present invention, the filter module is manufactured from a sheet material which has areas at the edge of the openings forming the inlet channels, the thickness of which being reduced to a predefined smaller thickness than that of the sheet material remote from those openings.

Such structure of the sheet material in the vicinity of the openings forming the inlet channels increases the surface area on the inlet channel side, a means which enhances the filtration capacity of the filter module thereby increasing the service life of the filter module.

Thus, the surface area provided by the inlet channels of these wrap roll filter modules is no longer a limiting factor for the filter area and capacity of the filter module, while the surface area provided by the outlet channels, i.e., downstream of the filtration module, usually never was limiting the service life of the filter modules.

This effect may already be achieved with a relatively small reduction in the thickness of the sheet material as long as the gap created in these areas in between the layers is significantly larger than the largest aspect of the particles contained in the fluid to be treated.

The areas of sheet material of smaller thickness at the edge of the openings forming the inlet channels preferably are deformed, more preferably compressed to a predefined thickness.

While in principle various operations could be used in order to reduce the thickness of the sheet material at the edge of the openings forming the inlet channels, e.g., by machining operations, deforming the material or compression of the material to a predefined thickness is preferred. This is especially true when a sheet material is used which is compressible itself.

Preferably, the areas of smaller thickness of the sheet material extend in the direction to openings forming outlet channels. Of course the extension in that direction is only such that the filtration process is not negatively affected. In doing so it provides a means to optimize the length of the migration path for the fluid from the inlet area of the filter module through the body of sheet material to the closest outlet channel.

In a further preferred embodiment of the present invention, the areas of smaller thickness extend in the direction of adjacent openings of the same kind, the areas such forming one or more continuous flow paths extending along the winding direction of the sheet material.

Such embodiment provides for an optimum of inlet channel surface area and an optimum of service life for the filter module.

As an alternative to deformation or compression of the sheet material prior to winding the same to form the body of the filter module, a first strip-like element of a macro-porous material may be co-wound with the sheet material to cover the areas of the sheet material comprising the openings forming inlet channels. By co-winding the macro-porous material in strip-like form, automatically a compression of the sheet material in the area comprising the openings forming inlet channels is achieved and due to the macro-porous character of the material, the surface area of the sheet material is still accessible to the fluid to be filtered without hindering the fluid essentially to contact the sheet material surface on the inlet side of the filter module. Optionally, the strip-like element may comprise openings essentially matching the openings of the sheet material.

The term macro-porous as used in this context means any three-dimensional open-pored structure which does not contribute noticeably to the filtering effect and which preferably essentially presents no flow restriction to the fluid in the inlet channels.

Again, an increased surface area on the inlet side of the filter module is provided, which makes maximum use of the sheet material used for the wrap roll. In addition, the use of the strip-like element of a macro-porous material provides for a defined and pressure resistant structure for the filter module and may in addition serve to reinforce the body of the filter module. Therefore, such type of filter module may also be used in heavy duty applications.

While the macro-porous material as an additional material co-wound with the sheet material results in a compression of the sheet material in the area of the openings forming the inlet channels already, it is preferred that the macro-porous material is at least less compressible than the sheet material in order to make sure that the macro-porous structure of the strip-like element is maintained in the finished filter module. More preferably, the macro-porous material is essentially incompressible. Essentially incompressible means that the macro-porous material essentially does not change its macro-porous structure upon the application of the compression forces needed to manufacture the filter module.

In order to make maximum use of the increased surface area on the one hand and in order not to disturb the overall structure of the filter module on the other hand, it is preferred that the strip-like element has tapering edges or edges with a wedge-shaped cross-section.

In such a configuration the compression of the sheet material is maximal in the area of the openings forming inlet channels, whereas the compression gradually is reduced in the direction extending from these openings in the direction to the outlet channels.

This allows for a smooth building-in of the strip-like element into the filter module which at the same time provides for additional security with respect to avoidance of bypasses between adjacent layers of sheet material.

In order to provide further security with respect to the bypass problem, a second strip-like element may be co-wound with a sheet material to cover the areas of the sheet material comprising the openings forming the outlet channels. The second strip-like element may be used together with the first strip-like element or independent of the same. The second strip-like element provides for a compression of the sheet material in the area of the outlet channels serving for an intimate contact of the sheet material around the openings forming the outlet channels which provides for additional safety against unwanted bypasses.

Preferably, the second strip-like element has openings to essentially register with the openings of the sheet material.

The material from which the second strip-like element is made, may be the same as the sheet material, since the material from which the second strip-like element is made need not necessarily be incompressible. The main function of the second strip-like element is to provide additional compression forces in the areas of the outlet channels so as to provide further security against bypasses.

The second strip-like element therefore may be made of a depth filter material, but may also be in some applications made of an essentially non-porous material. In addition, the second strip-like element may be made of a material which is essentially incompressible.

As is the case for the first strip-like element, the second strip-like element may also preferably have the form of a band having tapering or wedge-shaped cross sectioned edges. As with the first strip-like element, also here the wedge-shaped cross section allows for a smooth co-winding of the second strip-like element with the sheet material. Also the compression exerted by the wedge-shaped strip-like element is maximal at the edges of the openings forming the outlet channels and is gradually reduced in the direction of the edges of said band.

The dimensions of the openings in their smallest aspect should not be below about 0.5 mm except for sheet materials which do not swell in contact with the fluid to be filtered. Otherwise an undue increase in pressure drop may be observed. Preferably the smallest aspect is about 1 mm or more. In case of round openings this aspect corresponds to the diameter of the openings. The largest aspect of the openings may largely vary.

It is readily understood that the shape of the openings is not limited to a round, oval or elliptic form or slot-like shape, but the openings may have any polygonal form, e.g., rectangular or square shaped.

According to a further aspect of the present invention it is important that a majority of the openings of a layer (or one winding) of sheet material forming the inlet channels incompletely register with corresponding openings of an adjacent layer of sheet material.

By the specific size, shape and/or arrangement of the openings in the sheet material forming the inlet channels such that the openings of one layer do only incompletely register with the openings of the adjacent layer also contributing to the formation of the inlet channels provided in the body, an increased surface area is provided. Surprisingly, such incompletely registering of the openings may provide for a drastic increase in surface area, but at the same time, the increase in pressure resistance or pressure drop remains limited to acceptable values.

Incomplete registering of the openings provides a remarkable effect of increase in surface area resulting in an increased dirt capacity and therefore in an increased service life of the filter module when the overlap of the openings in the average amounts to about 90% or less. Therefore, for applications which are rather sensitive for increase of pressure resistance on the side of the inlet channels, an overlap of the opening of about 90% in the average may provide for a remarkable advantage over the wrap rolls disclosed in the prior art.

The overlap percentage mentioned above and below relates an overlap of areas of sheet material occupied by the respective openings calculated for the openings forming the inlet channels of the whole body.

For applications which are less sensitive to pressure resistance or pressure drop, the incomplete registering may correspond to an average overlap of the openings of about 80% or less which provides for a still increased effect of larger surface area on the inlet channel side.

When the incomplete registering of the openings corresponds to an average overlap of less than about 50% the effect of increase in dirt capacity and service life is no longer as pronounced as in the cases discussed above, whereas at the same time the increase of pressure resistance of the inlet channels becomes a factor which may not be neglected anymore.

Therefore, the incomplete registering of the openings preferably corresponds to an average overlap of about 50% or more.

It is easily understood by the person of ordinary skill in the art that the advantageous effect of increase in surface area on the inlet channel side not necessarily requires that essentially all of the openings forming inlet channels incompletely register with the corresponding opening of the adjacent layer(s). It is, however, preferred that at least about 75% of the openings (by number) forming the inlet channels, more preferably at least about 85% incompletely register with the corresponding openings of an adjacent layer. This measure ensures a more homogeneous increase of inlet channel surface throughout the body.

While the incomplete registering of the openings could be achieved by using openings of different shape and/or size, it is preferred according to the present invention to use the openings for each type of channels of a substantially uniform size and shape, which greatly facilitates the production of the sheet material having the openings formed therein.

This also facilitates the design of the filter module and the tools for manufacturing same.

The afore-discussed teaching of incomplete registering of the openings forming the inlet channels is in contrast to the teaching of U.S. Pat. No. 2,339,703, which specifically requires that the openings register with one another. This reference specifically calls for a suitable spacing of the openings to cause the openings to mate. Anything more than a slightly irregular positioning of the openings resulting in slightly irregular edges of the channels is not accepted to avoid interference with the effectiveness of the filter.

The same teaching may be derived from WO 03/041829 A2. This reference allows an orientation of the channels with respect to the winding axis of 30° to 90°.

According to another aspect of the present invention the openings forming the channels are preferably separated from one another by stays of sheet material. The stays may be easily designed to provide enough stability to the body to withstand a substantial pressure differential during operation of the filter module.

In a preferred embodiment the openings forming the inlet channels have an extension in the winding direction of the sheet material which is longer than the extension of the stays separating these openings from one another in the same direction. Such type of design of the sheet material will avoid that stays in between openings may overlay an opening of an adjacent layer of sheet material and disturb the channel structure.

The structure of the channels, especially of the inlet channels, may be of a simple, more or less tubular form showing projections of recesses in the surface of the channels which result from the incomplete registering of the openings forming the inlet channels. However, the form of the channels can also be much more complex. In case the openings of the inlet channels have an extension in the winding direction much longer than the extension of the stays measured in the same direction, a plurality of openings may form inlet channels that constitute together a contiguous ring shaped channel structure which is intersected at various portions by stays separating the openings from one another.

In this case, a relatively large surface area is provided per inlet channel while at the same time, the stays of sheet material intersecting the channel volume still provide for sufficient stability, not only of the structure of the inlet channels during operation of the filter module but also facilitate winding of the sheet material to form a body in a precise and repeatable manner.

In order to maximize the surface area of the inlet channels versus the surface area of the outlet channels while keeping consumption of sheet material at a minimum, it is preferred that the number of openings forming inlet channels is higher than the number of openings forming outlet channels.

Another measure to promote such an effect is to make the openings forming the outlet channels smaller than the openings forming the inlet channels.

A significant effect of this measure may be observed when the difference in size of the openings amounts to about 10% or more, based on the size of the openings forming the outlet channels.

In order to make maximum use of the sheet material used to produce the wrap roll body, the number of inlet channels is preferably higher than the number of outlet channels.

The number of inlet channels may be two fold or more of the number of outlet channels.

Calculations done by the present inventors show that when the number of inlet channels is approximately threefold the number of outlet channels, a maximum use of the sheet material is possible. This maximum use not only relates to its use to provide a stable filtering structure but also to its effect on the filter capacity of the filter module, which means its service life.

Preferably, the openings in a sheet material for each type of channels are arranged in parallel rows. This allows an easy design of the sheet material and the arrangement of the various types of channels so as to make maximum use of the sheet material.

Preferably the openings forming the inlet channels are arranged in groups of two or more adjacent rows, whereas the openings forming the outlet channels are arranged in groups of a lesser number of rows. The number of rows in a group of rows of openings forming outlet channels may be just one.

This allows an increase of surface area for the inlet channels while keeping the surface area of the outlet channels to the minimum necessary. During filtration the fluid entering the inlet channels will migrate through the sheet material and be collected in the adjacent outlet channels.

Maximum use of the sheet material requires that more than one inlet channel provide fluid to be filtered for one outlet channel.

In order to facilitate the incomplete registering of the openings, in a preferred embodiment according to the present invention the openings forming the inlet channels are arranged in a predefined pattern, each pattern comprising a number of openings, said pattern being repeated multiple times along the length or winding direction of the sheet material such that the distance between openings of the same kind within one pattern is different from the distance of adjacent openings of the same kind belonging to two subsequent patterns.

This means that, for example, when a punching tool is used to provide a number of openings in the sheet material, the punching tool is used with an offset for forming the adjacent opening pattern such that the distance between adjacent openings formed in two punching operations is different from the distance between adjacent openings resulting from one punching operation.

According to another aspect of the present invention the design of the module may be advantageously used to a depth filter characteristic. To that effect, the sheet material is selected from a depth filter material and said sheet material of the module is maintained in a compressed state, such that the body of wound layers constitutes a depth filter unit precluding bypasses. These measures ensure that the fluid to be filtered migrates through the depth filter material and does not find a shortcut from an inlet to an outlet channel between adjacent layers of sheet material.

It has been found that a compression of the sheet material, such that the thickness of the compiled layers of the body amounts to about 99% or less of the thickness of the same number of individual layers of sheet material, is often enough to solve the bypass problem. The amount of compression needed is of course depending on the compressibility of the sheet material itself so that with easily compressible sheet material a more pronounced compression of the body may be advantageous.

The compression of the body within the above mentioned limits is suitable for solving the bypass problem especially where the sheet material used is a material which swells in contact with the fluid to be treated. In such a case, in addition to the compression forces exerted on the sheet material in the dry state of the body, the forces created in the course of the swelling of the sheet material support providing an intimate contact of the adjacent layers of the sheet material within the body.

Furthermore, the forces generated upon swelling of the sheet material do not only act in the same direction as the compression forces but also in perpendicular directions thereof which further contributes to minimize the bypass risks.

The forces created by the swelling of the sheet material do not simply add to the compression forces when an elastically/plastically deformable sheet material is used. Part of the forces will then result in a partly permanent deformation of the microstructure of the depth filter material.

When a sheet material is used which does not swell in contact with the fluid to be filtered the restoring forces of the elastically or elastically/plastically deformable sheet material are solely responsible for maintaining the intimate contact of adjacent layers of sheet material. In such cases a somewhat higher compression of the body may be advisable.

The use of easily compressible sheet material opens up multiple opportunities to modify the filter characteristic of the filter module and to adapt the sheet material in the body to various filtration tasks without having the need to produce different types of sheet material. By varying the degree of compression of the body the permeability of the sheet material can be modified, resulting in modified retention and separation characteristics.

Typical sheet materials of cellulosic fibers have mass per unit area of about 300 to about 2.000 g/m$^2$ and a thickness of about 2 to about 7 mm, more preferably about 3 to about 6 mm. Sheet materials of cellulosic fibers with a thickness of about 4 to about 5 mm are most preferred because they allow a most economic drying process during the manufacturing of the sheets.

However, usually the thickness of the compiled layers of the compressed body will amount to about 20% or more of the thickness of the same number of individual layers of sheet material. If the compression is higher than that limit, there might result an undesirable high reduction in the dirt retention capacity. On the other hand, a high compression improves the filtration efficiency for smaller particles.

A further preferred limit to compress the body corresponds to about 50% or more of the thickness of the compiled individual layers of sheet material. A compression within this limit is easier to be handled with respect to the desired filter characteristics.

Nevertheless, often enough with compressible sheet material compression to a thickness of about 85% or more of the compiled individual layers will provide very good results. In a large number of cases, the compression preferably amounts to a thickness of the compiled individual layers of about 97 to about 85%.

In a number of applications, for example in the biopharmaceutical or food technology area, it is of utmost importance to use materials only which have been certified for the type of application.

In this respect, in a preferred embodiment of the present invention the body of wound layers essentially consists of a unitary material, which means that the body is essentially constituted by the sheet material itself not needing any sort of adhesive or other type of auxiliary agents or means to provide for a bypass-free depth filter material.

Closure of the first type of channels adjacent to the inner peripheral surface may be accomplished by covering corresponding openings of the sheet material with a fluid impervious material, e.g., a tube element which includes openings to register with the openings of the sheet material of the second type channels and preferably defining the passage. The tube element may optionally function as a support element.

Likewise, the closure of the second type of channels adjacent the outer peripheral surface of the body may be accomplished by covering the respective ends of the second type of channels with a fluid impervious material, however, leaving the first type of channels uncovered.

In the alternative, closure of the respective ends of the first and second type of channels may be accomplished by non-perforated portions of one or more further windings of sheet material.

In order to provide safe closure of the channels at one end thereof by sheet material, it is preferred when the innermost and outermost layers of sheet material, respectively, are compressed at least to the extent, the body as a whole is compressed.

This ensures that especially at the end portions of the channels no bypass or leakage may occur and again such measures avoid any use of adhesive or any other auxiliary material to that effect.

More preferably, at least several, e.g., three innermost and at least several, e.g., three outermost layers are compressed to an extent substantially corresponding to the degree of compression of the body as a whole. Of course, even more innermost and/or outermost layers may be used to provide a closure of the end portions of the channels, depending on the structure of the filter module and the application.

It is especially noted that the filter module according to the present invention may be provided without any sort of supporting structure and the inner peripheral surface of the filter module may constitute the passage itself.

According to a further aspect of the present invention, however, it may be advantageous to have a hollow support member supporting the inner peripheral surface of the body for specific filtration applications. In such cases the hollow support member preferably defines the passage of the body.

Such hollow support member may be made, for example, from organic synthetic polymer material, which is inert with respect to the fluid to be filtered. Examples for such polymeric material, which is preferably used to produce the hollow support member, are polyethylene, polypropylene, polyamide, partly or wholly fluorinated hydrocarbon resins etc.

In a preferred embodiment, the hollow support member is a hollow shaft, the wall of the shaft being perforated in order to provide access for the open ends of the channels opening to the inner peripheral surface of the body to the passage. At the same time it may serve as a means to close the ends of the first type of channels which remain open at the outer peripheral surface of the body.

It has been mentioned before already for various times that the sheet material may be compressible or non-compressible.

In a preferred embodiment, the sheet material comprises a matrix including a compressible material and/or a material which swells in contact with the fluid to be filtered.

In either case, compression of the sheet material during manufacturing and maintaining the sheet material forming the body in a compressed state during operation of the filter module and/or the use of a material which swells in contact with a fluid to be filtered, a body is provided which may be used as a depth filter unit avoiding the problem of bypass.

However, sheet material which is at least somewhat compressible is preferred since such material may be formed to a body which may be tested for bypass problems without having need to actually pass fluid through the filter module.

In contrast, the use of material which is swellable but essentially incompressible in the dry state requires bringing the material in contact with the fluid in order to provide the full function or characteristics of the filter unit.

According to still another aspect of the present invention the sheet material may comprise a matrix incorporating an additive, said additive being preferably in particulate form.

Particulate form according to the present invention means any sort of particulate material being it, e.g., granular, fibrous or needle form.

The additive present in the sheet material amounts preferably up to about 70% by weight, based on the weight of the sheet material.

The additives may be of organic or inorganic origin.

This very broad range of additives available allows for an easy adaptation of the sheet material to various filtration tasks and also to influence the characteristic of the sheet material with respect to its compressibility or swellability.

Furthermore, the filter module may be used for functions different from filtration, especially for fluid treatment, including ion exchange, catalytic reactions and the like with or without taking advantage of the possible filtration function of the module.

In a preferred embodiment of the present invention, the particulate additive is selected from porous particulate additives, so as to provide the opportunity to perform specific filtration tasks.

In another preferred embodiment, the additive may comprise a filter aid, which allows for specifically designing the sheet material for selected filtration applications.

In another preferred embodiment of the present invention, the additive may comprise a treatment agent which allows performing simultaneously to or instead of the filtration, a treatment of the fluid to be filtered.

In yet another embodiment, the additive comprises a reactive agent and the filtration module then provides for the opportunity to convert a component included in the fluid upon or instead of filtration of the same.

In another preferred embodiment, the additive may comprise an absorptive or adsorptive agent, which allows for further adaptation of the sheet material and its characteristic to a specific filtration task.

Examples for additives which may be used are kieselguhr, perlite, bentonite, activated carbon, zeolite, micro crystalline cellulose and PVPP (cross-linked polyvinylpyrrolidon).

Examples of filtration tasks for the various additives are as follows:

PVPP is preferably used in the stabilization of beer, since it allows removal of polyphenols.

Activated carbon is used to, e.g., remove proteins, colorants, pyrogens etc. from the fluid to be treated.

Kieselguhr and micro-crystalline cellulose improve the removal rate for fine particles. Micro-crystalline cellulose is preferred in applications where release of minerals from the additive into the filtrate might be of concern.

Perlite may be used to generate the so-called trubraum and improves thereby the dirt holding capacity.

Zeolite is an appropriate and versatile additive for binding metal ions, water and the like, depending on the specific structure and composition thereof.

Bentonite is a useful additive for the fining of wine.

Preferably the sheet material comprises a matrix including organic polymer material. The organic polymer material may be a naturally occurring organic polymer material like cellulosic fibers. Synthetic polymers, especially in the form of sintered or foamed polymeric materials or organic fiber materials are also preferred organic polymer materials.

Since many filtration applications need a sterile environment, in a preferred embodiment the sheet material is selected from sterilizable material, i.e. material which allows sterilization of the filtration module without affecting the filtering characteristics of the module.

It has been explained before that the filtration module may be produced of the sheet material without having a support member for the numerous layers of sheet material.

According to a further aspect of the present invention, however, it may be advantageous to have a hollow support member supporting the inner peripheral surface of the body for specific filtration applications. In such cases the hollow support member preferably defines the passage of the body.

Such hollow support member may be made, for example, from organic synthetic polymer material, which is inert with respect to the fluid to be filtered. Examples for such polymeric material, which is preferably used to produce the hollow support member, are polyethylene, polypropylene, polyamide, partly or wholly fluorinated hydrocarbon resins etc.

In a preferred embodiment, the hollow support member is a hollow shaft, the wall of the shaft being perforated in order to provide access for the open ends of the channels opening to the inner peripheral surface of the body to the passage.

For quite a number of applications in the field of biopharmaceuticals and others, e.g., prefiltration and fine filtration in enzyme production processes, there arises the need to enhance and/or adapt the filter performance to specific needs which often may be served by adding a filter aid, usually in the form of a powder or slurry, to the inlet flow. The filter aid changes the character of the resulting mass of solids collected on the surface and within the structure of the filter material in a manner which enhances the filtration characteristics of the filter. When this enhancement is accomplished by adding the filter aid to the process fluid to be treated, it is called a body feed process. When the enhancement is accomplished by adding the filter aid to a fluid that is conducted through the filter before the process fluid is introduced, it is called a precoat process. A precoat process may be conducted prior to filtering a process fluid using a body feed process and the fluid used for a precoat process may be different from or the same as the process fluid.

Therefore, according to another aspect of the present invention, the filter module comprises at least one type of channels, where the channel surface supports a precoat, preferably in the form of a porous, essentially continuous layer. Most often such type of channels will be the inlet channels.

If there is a continuous flow path created by areas of reduced thickness or more specifically by compressed areas at the edge of the openings, such flow paths preferably also have a surface supporting a precoat.

If a macro-porous strip-like element is used to provide for the areas of smaller thickness, the surface provided by the macro-porous strip-like element also preferably supports a precoat which may be in the form of an essentially continuous porous layer of said precoat material.

In a further preferred embodiment, the precoat comprises two or more components. This provides for further possibilities to adapt the properties of said material to specific tasks.

Preferably at least one of the components of the material is in particulate form.

For specific applications, the precoat comprises a porous particulate component. The porous particulate component may serve specific purposes to treat the fluid to be filtered and/or capture specific components of the non-filtrate.

Likewise the precoat may comprise a filter aid as a component in specific applications.

In another embodiment, the precoat may comprise a treatment agent and/or a reactive agent as a component.

In still another embodiment, the precoat may comprise an absorptive or adsorptive agent as a component.

Examples for the afore-mentioned components for the precoat are the following:

Kieselguhr, perlite, bentonite, activated carbon, zeolite, micro-crystalline cellulose and PVPP.

The aspects to select a specific component for the porous layer can be essentially the same as previously discussed in connection with the selection of additives for the sheet material.

The above described filter modules offer a versatile means to accommodate a large number of specific needs, especially in the area of biopharmaceutical filtration processes or the fine filtration in enzyme production processes.

The deposition of a precoat, especially as a continuous layer of porous material, on the surface of at least one type of the channels of the body provides an inexpensive means to further enhance the filtration performance.

According to a further aspect of the present invention the filter module preferably comprises two end pieces to be sealingly positioned with a front face against the opposite ends of the passage in said body in order to accommodate the body of the filter module in filter housings or other pre-existing environments. At least one of the end pieces comprises an opening to provide access to said passage.

The front faces of the end pieces may contain sealing elements in order to sealingly engage the opposite ends of the passage of said body. If the filter module is provided with a hollow support member, the end pieces may cooperate with the end faces of said support member.

Furthermore preferred is to have end pieces which comprise sealing flanges protruding from said front faces, said flanges being designed to contact and optionally also compress at least the innermost layer of the sheet material thereby providing a sealing element free seal between the body and the end pieces.

Said end pieces preferably additionally comprise a support flange protruding from the front faces and mating with the inner peripheral surface of the body or the hollow support member. This embodiment is especially designed to cooperate with the body of the filter module when a compressible sheet material is used. In such a case, the flanges may have a wedge-shaped cross section and penetrate at least partly the edges of the sheet material so as to compress the same providing for a more dense structure of the sheet material which enhances the sealing effect.

In further preferred embodiments, the protruding flanges designed to contact and compress two or more of the innermost layers of sheet material of said body and the protruding flange may have a double wedge-shaped structure of two concentrical wedge-shaped rings contacting two or more innermost layers of sheet material of said body.

In case a support member is used to support the inner peripheral surface of the body, it is preferred that the hollow support member has radially extending annular protrusions in its portions adjacent to the ends of the body so as to provide a form fit with the compressible sheet material, avoiding slippage of the sheet material when the end pieces are sealingly engaging the ends of the body.

As explained earlier on, it is advantageous when the module is compressed such that the body of wound layers constitutes a depth filter unit, once the sheet material is made of a depth filter material.

According to yet another aspect of the present invention clamping means are positioned on the outer peripheral surface of the body in order to maintain the compressed state of the sheet material of the filter body.

The clamping means may directly act on the outer peripheral surface of the body and preferably acts on those areas of the body comprising the second type of channels. This measure provides for additional safety against bypass risks.

In another preferred embodiment, the clamping means directly act on the outer peripheral surface of all areas of the body except those comprising the first type of channels. This provides a maximum of safety against bypass problems as outlined before. If the clamping means are made of a fluid impervious material, it may be used to close the ends of the second type of channels at the outer peripheral surface of the body. In an alternative embodiment, closure of the second type channels may be provided by a separate closure element on top of which the clamping means may be positioned.

In another embodiment, the areas of the body comprising outlet channels are compressed to a greater extent than those areas comprising inlet channels. This provides for maximum flexibility to enhance the surface area on the inlet side of the filter module and provides maximum safety against bypass problems likewise.

In a further preferred embodiment the clamping means comprise a sheet like material including apertures to match the openings of the outermost layer of sheet material, contributing to form inlet channels.

Furthermore preferable clamping means show a shrinkage characteristic such as to at least match the shrinkage characteristic of the body of sheet material under sterilization conditions. Such a feature ensures that the compression of the body of sheet material is maintained even if the filter module has to undergo a sterilization process.

An example for a clamping means is a mesh type material or a perforated film material.

Organic synthetic film material, e.g. shrink film, may be easily used as a clamping means.

Alternatively, strip-like material may be used to maintain the body of sheet material in a compressed state.

In such case, preferably the openings of the different types of channels are arranged in different rows in the sheet material so as to provide disk like areas of the body, where outlet channels are arranged, such areas not comprising openings forming inlet channels.

In such an embodiment the strips are preferably positioned on the outer periphery of the disk like areas of the body comprising the outlet channels.

In order to make maximum use in such a configuration of the sheet material forming the body of the filter module, it is preferable that the body comprises in the vicinity of and spaced apart from its both end faces a plurality of outlet channels. This provides for further filter capacity in that the end faces of the filter module may be left open and in communication with the inlet side of the filer module, such faces also contributing to the filtration capacity of the filter module.

It has been found out that strip-like or sheet like material made of a polymeric material may often have favorable properties with respect to shrinkage when it is used together with cellulosic type sheet material forming the body, since the shrinkage effects observed with both type of material upon sterilization are similar.

While the individual layers of the body may be formed by individual portions of sheet material it is preferred that several if not all of the layers are formed of a continuous strip of sheet material spirally wound to form the body of the filter module.

According to a further aspect of the present invention the sheet material constituting the body of the filter module preferably consists of a unitary tape, i.e. one piece of tape only, having a first and a second end portion, the first end portion being positioned and forming the inner peripheral surface and the second end portion forming the outer peripheral surface of the body of the filter module. Preferably at least one of those first and second end portions of the tape has a smaller thickness than those portions of the tape between those two end portions.

If the first end portion forming the inner peripheral surface, or at least part of it, has a smaller thickness than those portions of the tape between the two end portions, a smooth winding is ensured starting from the innermost portion of the body of the filter module.

If the second end portion has a smaller thickness than those portions of the tape between those two end portions, especially the clamping means are tightly abutting the outer peripheral surface of the body also in the area, where the second end portion of the tape of sheet material ends.

Preferably, there is no stepwise configuration present at the second end portion of the sheet material.

In order to provide a very smooth transition, the first and/or second end portions of the tape have a tapering cross section in the lengthwise direction of the tape. Thereby a very smooth transition of the first and/or last winding may be obtained.

The present invention furthermore relates to a process for the manufacture of the filter module as outlined above and such process comprises:
forming the opening in the sheet material, reducing the thickness of the sheet material to a predetermined value in areas where openings are provided for forming inlet channels and winding the sheet material around a support element to form a body of a multiplicity of consecutive layers with an inner peripheral surface and an outer peripheral surface.

Reducing the thickness of the sheet material can be achieved in different ways.

In some cases it is preferable to carry out the thickness reducing prior to forming the openings. Depending on the nature of the sheet material forming of the openings may be facilitated.

With some sheet materials the thickness reducing can be carried out after forming the openings.

In many cases the thickness reducing can be carried out simultaneously with the formation of the openings. Especially preferred is the use of a punching tool to form the openings, the punching tool being provided with compression elements for compressing the sheet material in the areas of openings for forming the inlet channels.

As a further alternative the thickness reducing can be carried out while winding the sheet material to form said body.

As an alternative to deformation or compression of the sheet material prior to winding the same to form the body of the filter module, a first strip-like element of a macro-porous material may be co-wound with the sheet material to cover the areas of the sheet material comprising the openings forming inlet channels. By co-winding the macro-porous material in strip-like form, automatically a compression of the sheet material in the area comprising the openings forming inlet channels is achieved and due to the macro-porous character of the material, the surface area of the sheet material is still accessible to the fluid to be filtered without hindering the fluid essentially to contact the sheet material surface on the inlet side of the filter module. Optionally, the strip-like element may comprise openings essentially matching the openings of the sheet material.

The term macro-porous as used in this context means any three-dimensional open-pored structure which does not contribute noticeably to the filtering effect and which preferably essentially presents no flow restriction to the fluid in the inlet channels.

Preferably said macro-porous element comprises openings essentially registering with the openings forming the inlet channels. In this case the macro-porous element adds as little as possible to pressure drop and does not disturb fluid flow to the inlet channels.

Most preferably the thickness reducing comprises reducing the thickness of the sheet material from both sides of the sheet material. Thereby formation of ring shaped channel structures interconnecting a plurality of inlet channels is greatly supported.

In order to provide further security with respect to the bypass problem, a second strip-like element may be co-wound with a sheet material to cover the areas of the sheet material comprising the openings forming the outlet channels. The second strip-like element may be used together with the first strip-like element or independent of the same. The second strip-like element provides for a compression of the sheet material in the area of the outlet channels serving for an intimate contact of the sheet material around the openings forming the outlet channels which provides for additional safety against unwanted bypasses.

The material from which the second strip-like element is made, may be the same as the sheet material, since the material from which the second strip-like element is made need not necessarily be incompressible as the main function of the second strip-like element is to provide additional compression forces in the areas of the outlet channels so as to provide further security against bypasses.

The second strip-like element therefore may be made of a depth filter material, but may also be in some applications made of an essentially non-porous material. In addition, the second strip-like element may be made of a material which is essentially incompressible.

According to a preferred embodiment during winding the sheet material around a support element to form a body of a multiplicity of consecutive layers with an inner peripheral surface and an outer peripheral surface, the sheet material is compressed by a compression force when wound around the winding axis to provide intimate contact of each of the layers to the adjacent layer(s), said compression force being applied in a radial direction by a roller.

It is important according to the process of the present invention to apply the compression force in a radial direction by way of a roller, co-rotating with the body of sheet material during the winding process. Then not only a carefully controlled compression force may be applied, but also the sheet material is treated very carefully, and sheet material may be used which does not need to have high tensile strength, since the compression force is separately applied and need not be created by tensile forces exerted on the sheet material.

It has been found that a compression of the sheet material, such that the thickness of the compiled layers of the body amounts to about 99% or less of the thickness of the same number of individual layers of sheet material is often already enough to solve the bypass problem. As explained in detail above, the amount of compression needed is of course depending on the compressibility of the sheet material itself so that with easily compressible sheet material a more pronounced compression of the body may be advantageous.

However, usually the thickness of the compiled layers of the compressed body will amount to about 20% or more of the thickness of the same number of individual layers of sheet material. If the compression is higher than that limit, there might result an undesirable high reduction in the dirt retention capacity. On the other hand, a high compression improves the filtration efficiency for smaller particles. Therefore, the modification of the compression force exerted by the roller is a means to adapt the filtration characteristics of a given sheet material to specific filtration applications.

A further preferred limit to compress the body corresponds to about 50% or more of the thickness of the compiled individual layers of sheet material. A compression within this limit is easier to be handled with respect to the filter characteristics to be achieved.

Nevertheless, often enough with compressible sheet material compression to a thickness of about 85% or more of the compiled individual layers will provide very good results. In a large number of cases, the compression preferably amounts to a thickness of the compiled individual layers of about 97 to about 85%.

Figure 2:
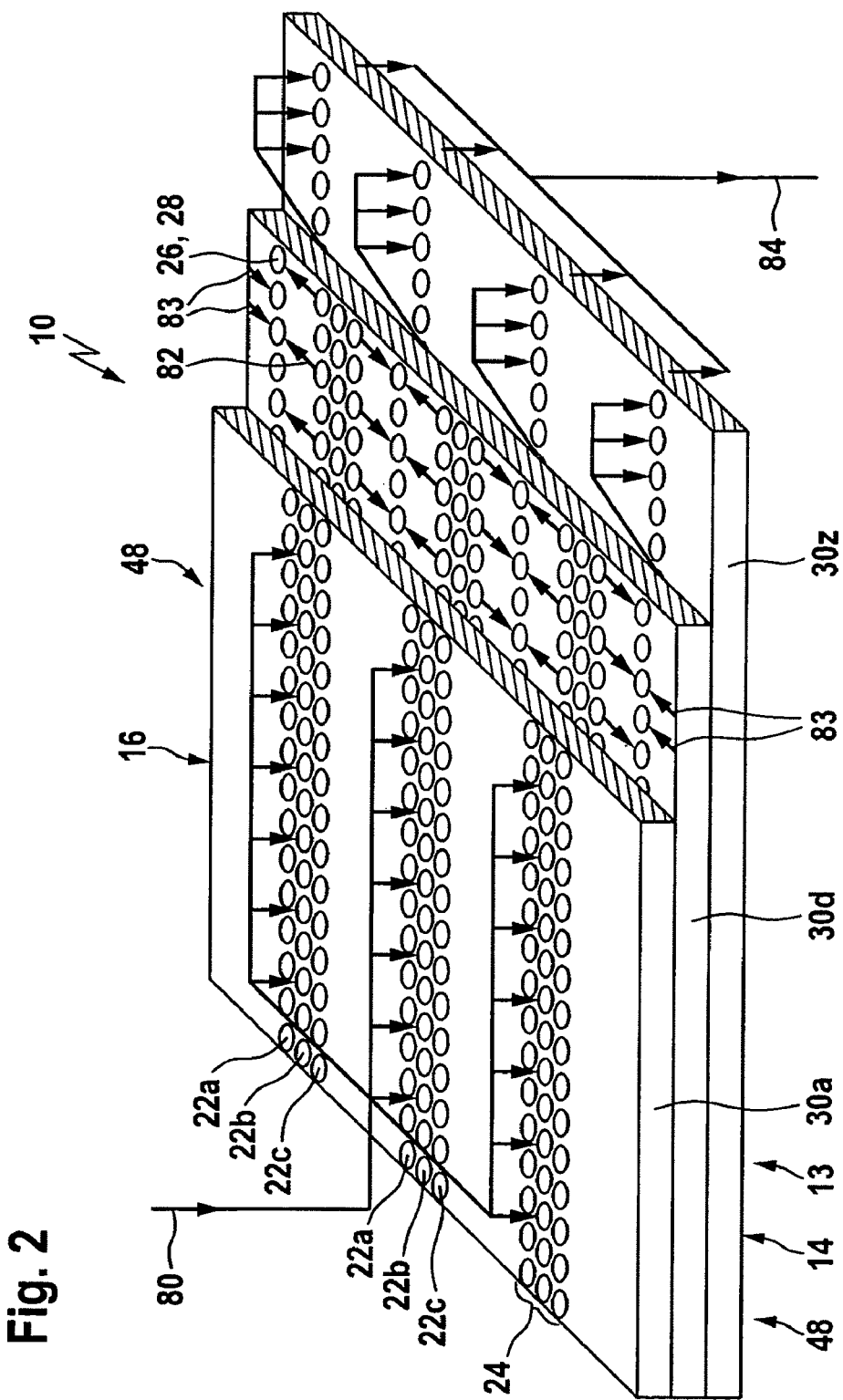
Figure 3B:
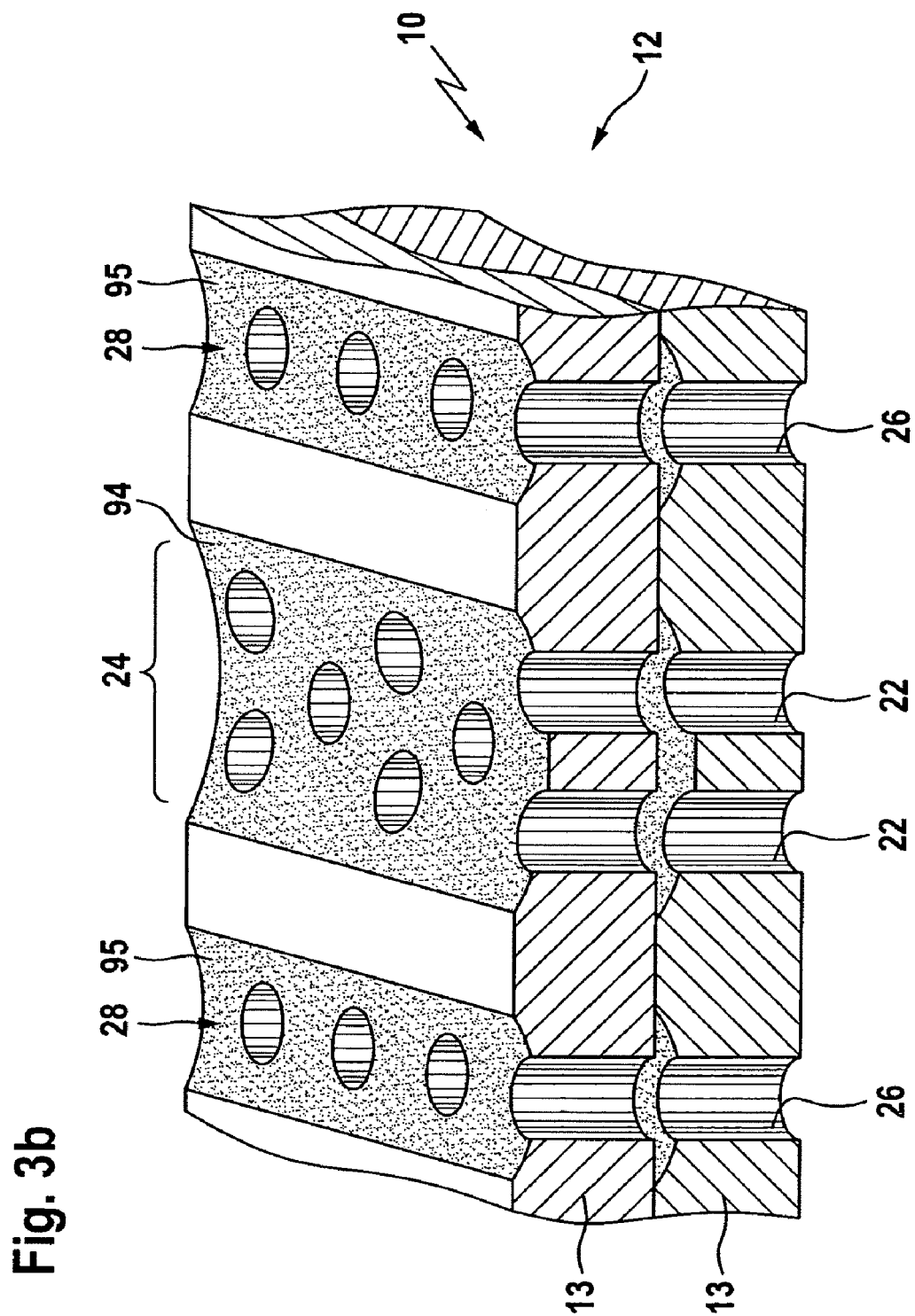
Figure 3C:
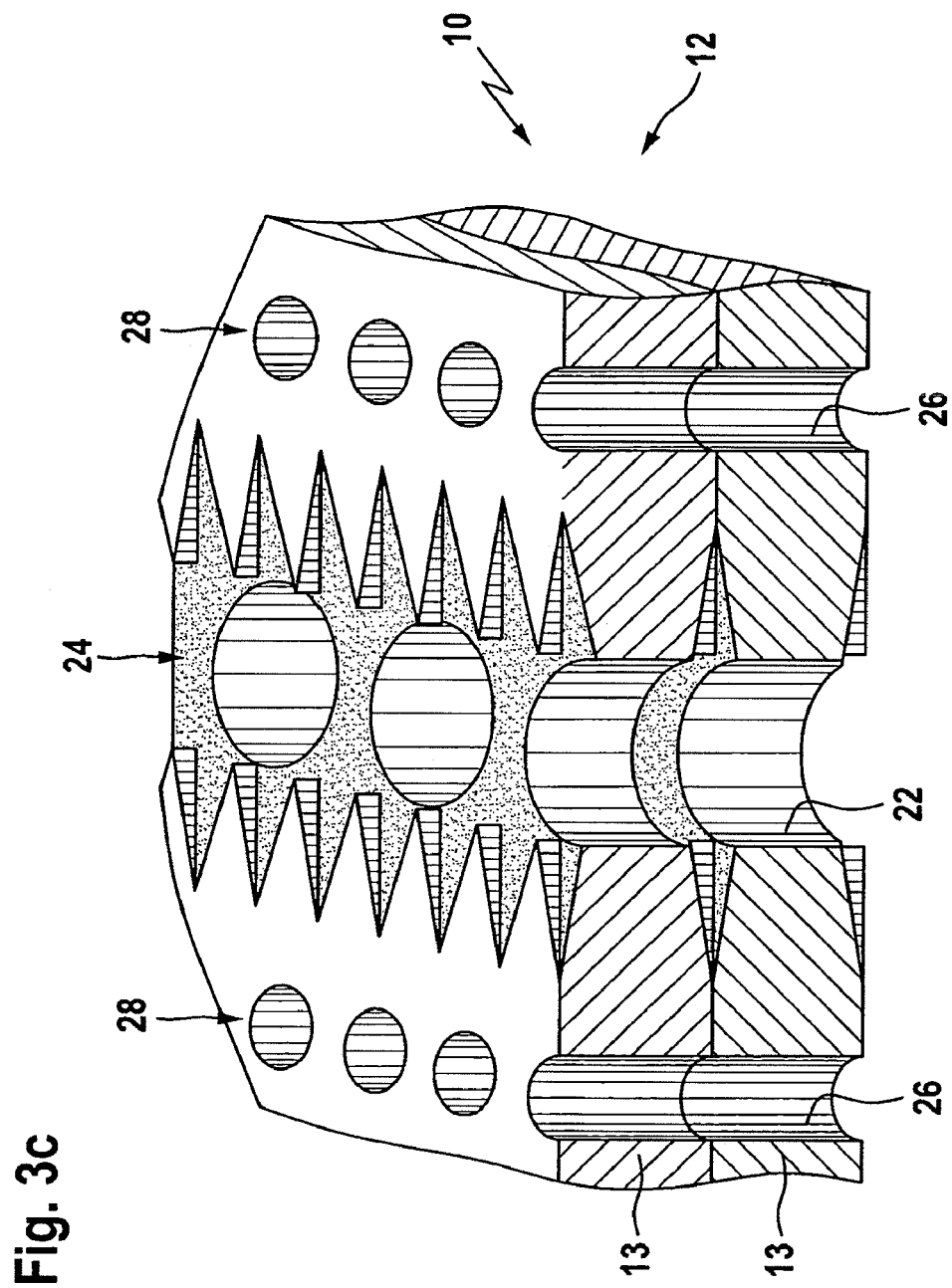
Figure 4:
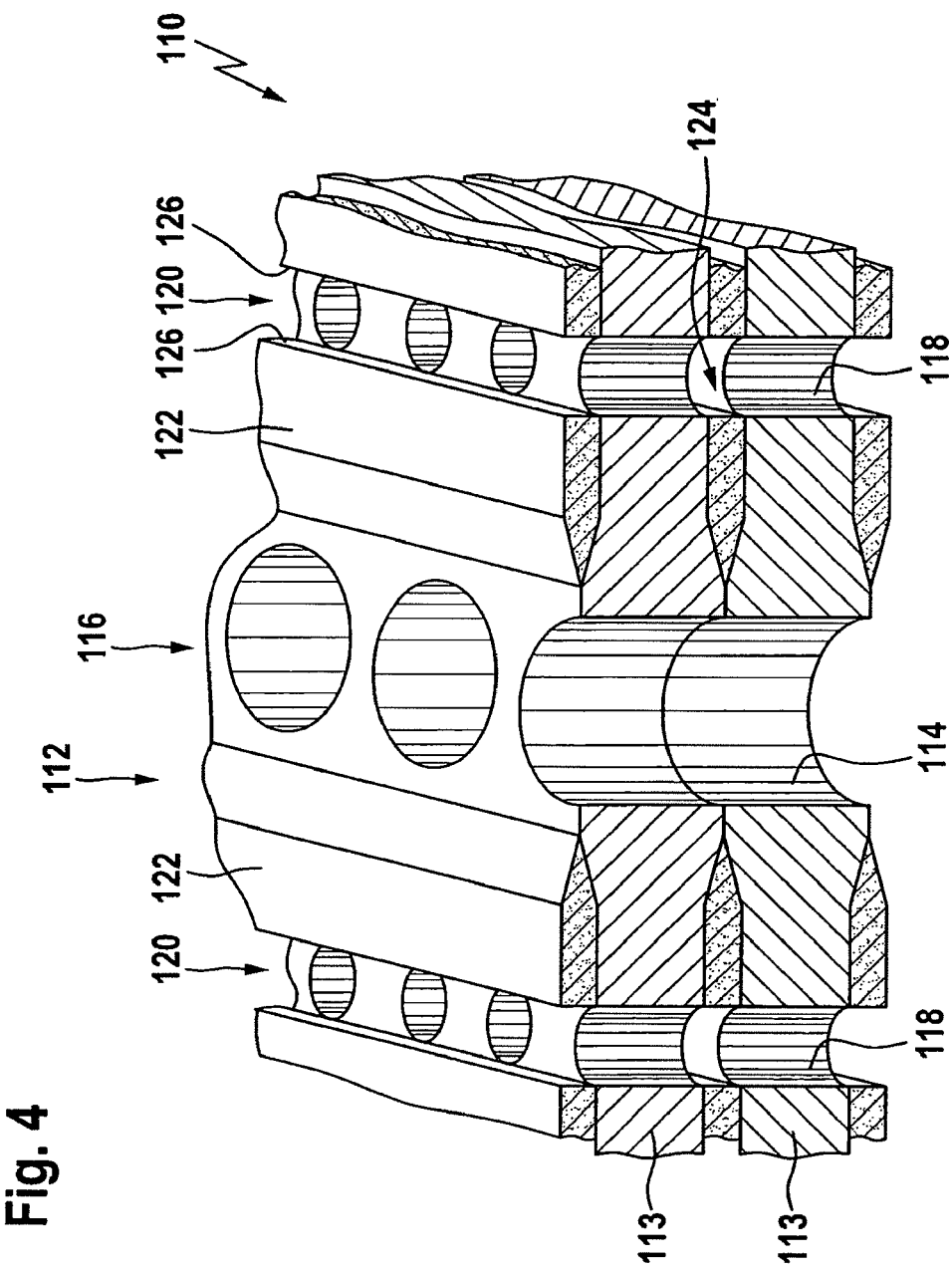
Figure 5:
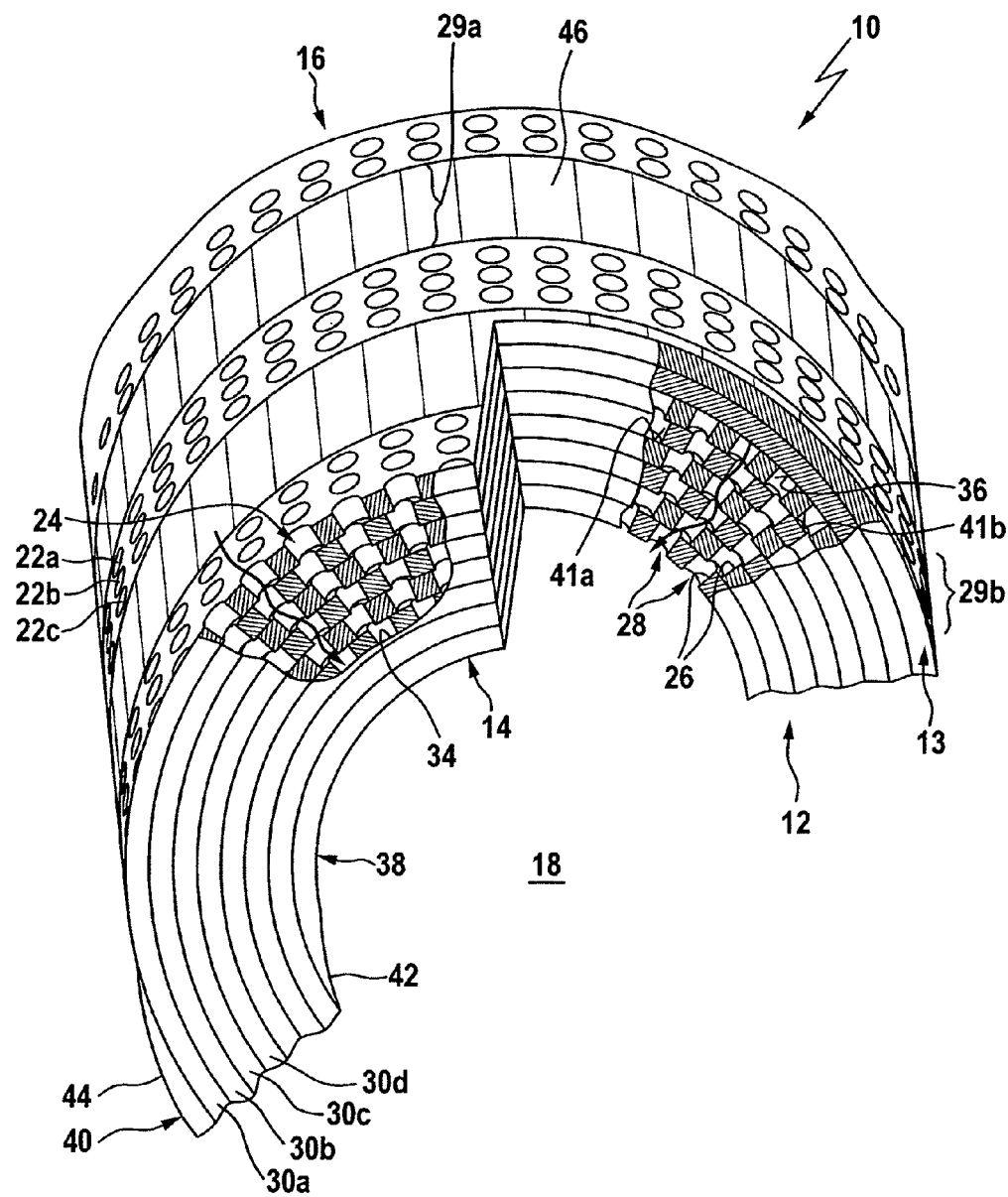
Figure 5A:
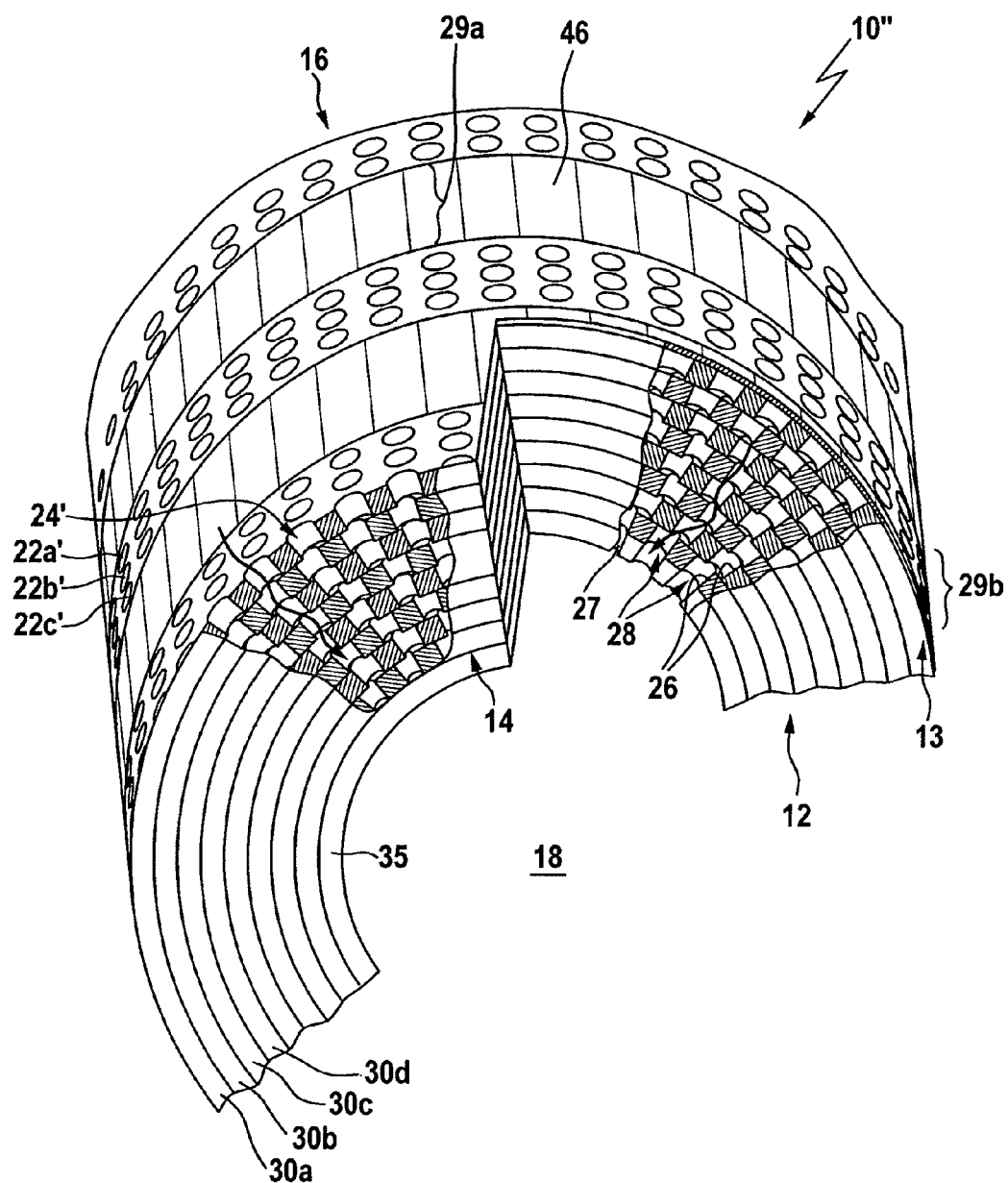
Figure 6:
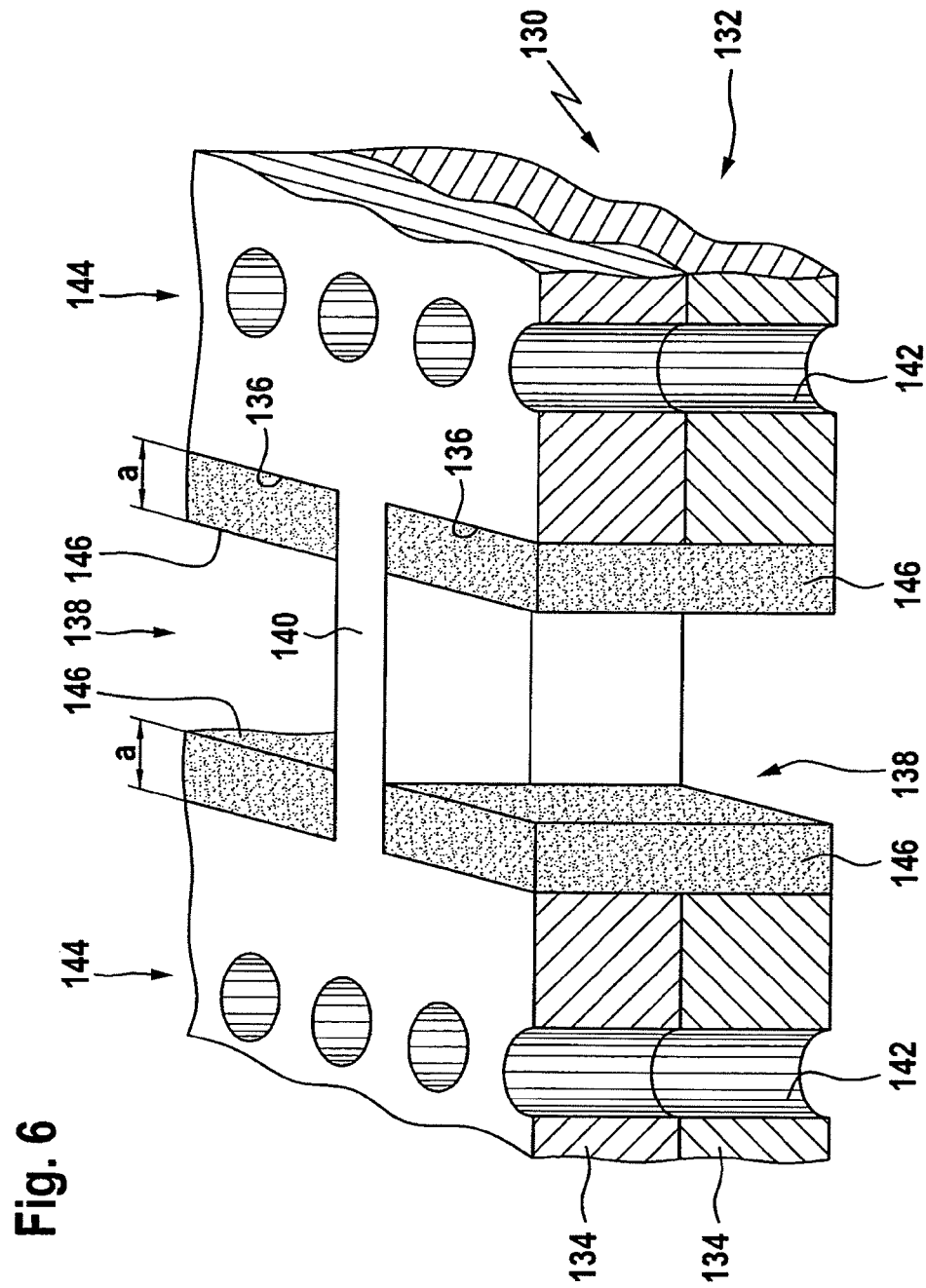

The above described and further advantages of the present invention will be apparent from the following description of the figures of the drawing. The individual figures show:

FIG. 1: A first embodiment of an inventive filter module with a body of wound layers of sheet material;

FIG. 2: a schematic representation of several layers of sheet material of the filter module of FIG. 1;

FIGS. 3a, 3b and 3c: a partial cross-section through several layers of the sheet material of the filter module of FIG. 1;

FIG. 4: an alternative embodiment to the structures shown in FIGS. 3a to 3c;

FIG. 5: a partial cross-section through a filter module according to FIG. 1,

FIG. 5a: a modification of the filter module of FIG. 5;

FIG. 6: partial schematic cross-sectional representation of various layers of sheet material of a filter module according to a further embodiment of the present invention;

FIG. 7: partial cross-section of an end portion of a filter module according to FIG. 1; and FIG. 8: a schematic representation of part of the manufacturing process of the filter modules according to the present invention.

FIG. 1 shows a filter module 10 of the present invention, comprising a body 12 of wound layers of a sheet material 13.

The body 12 of filter module 10 comprises an inner peripheral surface 14 and an outer peripheral surface 16. Within the body 12 there is a passage 18 which extends through the body 12 along its winding axis 20, coextensive with the inner peripheral surface of the body. The inner peripheral surface of the body is in fluid communication with the passage 18 which is constituted in the embodiment of FIG. 1 by a support member in the form of a hollow, perforated shaft (not shown in FIG. 1).

The sheet material 13 comprises a large number of openings 22 which in case of the embodiment shown in FIG. 1 are of circular shape, cooperating to form a first type of channel 24 which opens to the outer peripheral surface 16. Channels 24 generally extend in the direction from the outer to the inner peripheral surface of the body 12.

The sheet material 13 furthermore comprises a plurality of openings 26, cooperating to form a second type of channels 28 which open to the inner peripheral surface 14 of the body 12 (cf. FIG. 5). Channels 28 generally extend in the direction from the inner to the outer peripheral surface of body 12.

For ease of reference, the first type of channels 24 will be called inlet channels, the second type of channels 28 will be called outlet channels.

It has, however, to be noted that it is within the scope of the present invention that the channels 24 which open to the outer peripheral surface 16 may function as outlet channels, whereas the channels 28 which open to the inner peripheral surface 14 than serve as inlet channels. The fluid flow would then be reversed from passage 18 into channels 28, through the body 12 of sheet material 13 and the outlet channels 24 collecting the filtrate and draining it to the outer peripheral surface 16.

Preferably, the openings 22 and 26 are arranged in the sheet material 13 in parallel rows so that the inlet and outlet channels 24 and 28, respectively, are formed in separate disk shaped portions 29a and 29b of the body 12.

On both of its front faces 48 the filter module 10 is supported by end pieces 150 which will be described in further detail in connection with FIG. 7.

FIG. 2 schematically shows three layers of sheet material 13 of the filter module 10 of FIG. 1. While in the representation of FIG. 1 for simplicity reasons only a single row of openings forming inlet channels are shown, FIG. 2 shows in more detail a preferred opening pattern for the inlet channels 24.

Layer 30a corresponds to an outermost layer of sheet material 13 constituting the outer peripheral surface 16.

Layer 30d is an intermediate layer of the body 12 and layer 30z corresponds to an innermost layer constituting the inner peripheral surface 14 of the body 12.

Of course, the body 12 of filter module 10 usually has a much larger number of layers 30 but the afore-mentioned layers 30a, 30d and 30z show all details necessary to explain the function of the inventive filter module 10.

In order to make full use of the sheet material 13 in the filter module, groups of three parallel rows of openings 22a, 22b and 22c are provided, the openings being of circular cross section.

In order to further maximize use of the sheet material 13, these three rows of openings 22a, 22b and 22c could be arranged within their group of rows in a staggered configuration which is shown and further discussed in connection with the representation of FIG. 3b.

FIG. 2 mainly serves the purpose to explain the fluid flow through the body of sheet material 13 of filter module 10 rather than to give specific other details of the construction of the filter module.

As noted before, the outer layer of sheet material 30a constitutes the outer peripheral surface 16, is exposed to inflowing fluid to be treated and only comprises openings 22 contributing to the formation of inlet channels 24. The innermost layer 30z, constituting the inner peripheral surface 14, comprises only one type of openings, namely openings 26, participating in forming outlet channels 28.

The fluid flow through the body 12 of filter module 10 is schematically shown by arrows 80, 82, 83 and 84. Inflowing fluid is divided up into the various streams entering the inlet channels 24.

The fluid to be treated after entering the inlet channels 24 over the whole surface 16 flows into the body 12 of filter module 10. Since the inlet channels 24 are closed off by the innermost layer 30z of sheet material 13, the fluid flow cannot continue through the inlet channels 24 into the passage 18 which is in fluid connection with the interior peripheral surface 14.

Therefore, the fluid flow distributes and continues migrating through the sheet material 13 as indicated by arrows 82 until it reaches an outlet channel 28 constituted by openings 26.

In the outlet channels 26, the filtrate is collected and drained to the inner peripheral surface 14 where it is combined as indicated by arrow 84.

Since it is of importance to have a large surface area available on the inlet channel side, the number of inlet channels 24 in this embodiment is approximately threefold of the number of outlet channels 28, the size of the openings 22 and 26 being approximately the same.

Also shown schematically in this drawing is that at the end faces 48 of the body 12 there is preferably a row of outlet channels 28 arranged so as to make use of the end faces 48 of the body 12 and have them participate in the filtration process.

This is indicated by arrows 83, representing flow from the end faces 48 of the body 12 to the outlet channels 28.

FIGS. 3a to 3c and 4 represent two layers of sheet material 13 of a filter module 10 cut out from the middle of body 12 of the filter module in FIG. 1 to explain the main aspect of the present invention.

Inflowing fluid enters the body 12 of sheet material 13 via the inlet channels 24, which are arranged in parallel rows. In some embodiments, the three rows of inlet channels 24 are arranged in a staggered configuration so as to use minimum portions of the area of the sheet material 13 for providing a maximum of surface area on the inner channel side without affecting the mechanical stability of the body 12.

The outlet channels 26 are arranged as single rows of parallel channels since increase of surface area is mainly of concern for the inlet side.

FIGS. 3a to 3c show various modifications of the inlet and outlet channel structures proposed by the present invention. The area at the edges of the openings forming the inlet channels and in FIG. 3b also for the outlet channels has been reduced to a predetermined thickness.

In FIG. 3a, the sheet material 13 comprises a single row of inlet channel openings 22 alternating with single rows of openings 26 forming outlet channels 28. In order to provide sufficient surface on the inlet side of the filter module 10, the cross-section of the openings 22 is much larger than the cross-section of the openings 26 forming the outlet channels 28.

Furthermore, the thickness of the sheet material 13 at the edges of the openings 22 forming inlet channels 24 has been reduced on both sides thereof to a predetermined thickness. The areas around the openings 22 with reduced thickness form a continuous channel-like structure 90.

Because of this, the surface area available is greatly increased since the surface area 90 around the openings 22 forming inlet channels 24 also contributes to the surface area where the inflowing fluid may directly and unabstractedly contact the surface of the sheet material 13. Two adjacent layers of the sheet material 13 then provide a continuous spiral channel 92 interconnecting the inlet channels 24 formed by one row of openings 22.

The fluid flow within the sheet material 13 not only occurs between the walls of the openings 22 in direction to the outlet channels 28 but also from the areas around the edges of the openings 22, having a reduced thickness.

As may be seen from FIG. 3a quite clearly, the reduced thickness of the sheet material when provided on both sides of the sheet material 13 increases the surface area available for inflowing fluid for penetrating into the sheet material 13.

As described before already, the filtrate is collected in the outlet channels 28 and drained to the inner peripheral surface 14 and passage 18 which both are not shown in FIG. 3a.

In FIG. 3b, an opening pattern comprising three parallel rows of staggered inlet openings 22 has been provided in the sheet material 13, where, however, areas 94 and 95 of reduced thickness of the sheet material are present not only in the areas around the edges of the openings 22 forming inlet channels 24, but also around the edges of the openings 26 forming outlet channels 28.

In this specific embodiment, the reduction of the thickness of the sheet material 13 has been provided only on one side of the sheet material 13.

The cross-sections of the openings 22 forming the inlet channels 24 and the openings 26 forming the outlet channels 28 are approximately the same. However, because of the increased number of inlet channels 24 with respect to the available outlet channels 28, the surface area available on the inlet side is much larger than on the outlet side.

FIG. 3c shows another modification of the area 96 of reduced thickness around the inlet openings 22 whereas the thickness in areas around the openings 26 forming the outlet channels 28 has not been reduced. The reduced thickness has been provided on both sides of sheet material 13.

It may be seen from this embodiment that a broad variety of configurations of areas of reduced thickness around the edges of the openings in the sheet material 13 forming inlet channels 24 is available and may be selected according to the filtration task to be performed.

FIG. 4 shows another embodiment of the present invention in the form of a filter module 110 which is shown only with a part of its body 112 represented by two adjacent layers of sheet material 113 were taken out of it similar to FIGS. 3a to 3c.

Therefore, both layers of sheet material 113 have opening patterns including openings 118 constituting inlet channels 120 as well as openings 114 forming outlet channels 116.

In order to provide an increased surface area on the inlet side, strip-like elements 122 of macro-porous structure have been co-wound with the sheet material 113 in order to provide for compression of the sheet material 113 in the areas around the openings 118 forming the inlet channels 120.

Because of the reduced thickness of the sheet material 113 around the inlet channels 120, the filter area has been increased. In order to further maximize the surface area on the inlet side, the diameter of the openings 118 can be made larger, while the diameter of the openings 114 forming the outlet channels could be made smaller.

In order to allow a smooth winding of the strip-like material together with the sheet material 113 and in order to allow an essentially smooth outer surface of the body 112 the strip-like elements 122 have a double wedge-shaped cross-section, the tapered edges of which pointing in the direction of the outlet channels 116.

The strip-like elements 122 may be divided in two parallel portions as is shown in FIG. 4 but they may also be of a unitary structure and have a double wedge-shape as is easily feasible from the representation of FIG. 4.

In the case of the divided structure of the strip-like elements 122 as shown in FIG. 4, there is provided a spiral channel 124 between the adjacent layers 113 interconnecting the inlet channels 120 of each row of openings 118 so that the filtrate enter the sheet material 113 in the area of the inlet channels 120 may also circulate in between these areas.

From FIG. 5 it is apparent that the openings 22 forming inlet channels 24, incompletely register with corresponding openings 22 of an adjacent layer of sheet material 13. For simplicity reasons the reduced thickness of sheet material 15 in the areas of the edges of openings 22 is not shown.

The inlet channels 24 are closed on their ends 34, located adjacent to the inner peripheral surface 14 of body 12 and not in communication with said passage 18. Correspondingly, the outlet channels 28 are open at their ends adjacent to the inner peripheral surface 14, but are closed at their opposite ends 36 adjacent to outer peripheral surface 16. In order to provide this structure of channels 24 and 28 in the body 12 of the filter module 10, the sheet material 13 comprises in a first end portion 38 openings 26 only which contribute to forming the outlet channels 28. No openings which could contribute to forming inlet channels 24 are found in that portion 38 of sheet material 13.

At its other end portion 40, the sheet material 13 comprises openings 22 only contributing to form inlet channels 24, and in that end portion 40 no openings 26 which contribute to forming outlet channels 28 are found.

Usually, the length of the end portions 40 and 38 is such that the closed ends 36 and 34 of the outlet and inlet channels, respectively, are covered and shut off by at least two consecutive layers of sheet material 13 within the body 12 adjacent to the inner peripheral surface 14 and the outer peripheral surface 16, respectively.

This is usually enough to ensure that the filter characteristic of the body 12 as a whole is maintained and no fluid to be treated may bypass the sheet material and find a shortcut from the inlet of the filter module 10 to the outlet of the filter module.

The filtering operation of the inventive filter module 10 has been described in some more detail in connection with FIG. 2 already.

As can be seen from FIG. 5, the openings 22 of adjacent layers 30a, 30b, 30c and 30d incompletely register such that the surface of inlet channel 24 does not show a smooth tubular surface but comprises the plurality of recesses 41a and projections 41b, respectively, increasing the surface area of the inlet channels 24 to a great extent, thereby increasing the filter capacity and the service life of the filter module 10.

Other methods of ensuring incomplete registration of the openings are possible and are included in the constructions envisioned in this patent. For example multiple punches, each having a somewhat different size cross-section and/or cross-sectional shape could be used to create openings which vary in size and/or shape from one opening to the next. When wound to form the body, the edges of these openings do not completely register, due to their differing sizes, any off-set in their locations and/or differing shape.

Likewise apparent from FIG. 5 is the gradually reduced thickness of the end portion 38 of the sheet material 13 at its very end, which may likewise be true for the end portion 40 at the outer peripheral surface 16 of body 12.

By having the end portions 38 and 40 with tapered sections 42 and 44, respectively, a smooth winding of the sheet material 13 is provided which contributes to a full contact of adjacent layers of sheet material 13 throughout the body 12.

The tapered portion 44 of end portion 40 of the sheet material 13 at the outer peripheral surface 16 of body 12 provides for a smooth outer surface 16, not comprising any step-like recesses on that surface.

This is of importance, once the body 12 of the filter module 10 is hold in compression by strip-like elements 46 which serve to keep the sheet material 13 of body 12, and therefore the body 12 as a whole, in a compressed state such that bypasses from inlet channels 24 to outlet channels 28 are avoided.

The strip-like elements 46 function as compression means and are positioned on the outer peripheral surface 16 of body 12 on such disk shaped portions 29a of the body 12 which comprise the outlet channels 28. The portion 29b of the body 12 comprising the inlet channels 24 are not covered by this strip-like elements 46. Therefore the compression of the body 12 in the areas 29a comprising the outlet channels 28 is somewhat higher than in the portions 29b of body 12 accommodating the inlet channels 24. This is of some importance for avoiding bypass problems, and the fluid to be filtered is forced to migrate through the sheet material 13 prior to reach the outlet channels 28 and the passage 18.

The tapered end portion 44 of the end portion 40 of the sheet material 13 helps to apply the compression force of the strip-like elements 46 around the whole outer peripheral surface 16 in an even fashion which makes sure that the body 12 has homogenous filter characteristics throughout the whole body.

The sheet material 13 of body 12 may be a depth filter material or may be a non-porous material depending on whether the filter module is to work as a depth filter unit or a surface filter unit.

Most of the depth filter materials useful in the present invention may be compressed or deformed. The portion of deformation, which is permanent, differs depending on the depth filter material used.

Preferably, the depth filter material is not only plastically or permanent deformable, but at least partly shows elastic properties so that upon compression of the sheet material 13, the elastic portion of the deformation helps to keep the adjacent layers of sheet material 13 in close contact with one another, although the surface of the sheet material 13 may in its original state not be perfectly planar.

The preferable depth filter material used according to the present invention may have different basic structures. For example, nonwoven fiber material may be used on the basis of melt blown fibers, cellulosic fibers or other naturally occurring fibers, organic or inorganic fibers, metal fibers, glass fibers, ceramic fibers, etc.

Also woven materials are possible with various fiber structures. The woven material may be monofil material, multifil material and/or multilayer material The basic materials may be cellulosic material, or other naturally occurring fibers, organic or inorganic fibers, the latter including metal fibers.

Also sintered materials may be a suitable depth filter material for use as sheet material 13 including sintered woven materials, sintered powder materials of different structure and particle sizes, mainly made of plastic or metal.

Furthermore, foamed material of plastic or naturally occurring polymers of different structure may constitute a sheet material useful in the present invention.

Depth filter materials manufactured of the basis of cellulosic fibers may be compressed substantially, i.e., very well below about 20% of their original thickness without destroying integrity of the filter layers. The degree of maximal compression of course depends on the presence or absence of additives combined with the cellulosic fibers. Such additives may very well be incompressible and may occur in amounts of up to about 70% by weight, based on the weight of the sheet material.

Cellulose based sheet materials are well suited for the present invention. They may be compressed to a thickness of, e.g., about 12% of the original thickness, using a compression force of 2700 N. When those materials are allowed to recover a thickness of about 20% of the original thickness, the elastic force amounts, e.g., to 530 N.

Other examples of useful cellulose based sheet materials, which may be used according to the present invention as sheet material 13 to form the body 12 may be compressed to a thickness of about 33% with a compression force of 3600 N and show a elastic force when released to a thickness of about 45% of its original thickness of 250 N.

Cellulosic material usually swells when contacted with aqueous media and in the latter example, the elastic force may be increased by the swelling effect to 310 N.

In an application where the sheet material 13 will not swell in contact with the fluid to be filtered, a somewhat higher compression will usually be used than in cases where the sheet material swells when in contact with the fluid to be filtered. This is often sufficient to ensure a safe operation of the filter module 10.

FIG. 5a shows a filter module 10" having a structure similar to the filter module shown in FIG. 5. Therefore, the description given above with reference to FIG. 5 also applies with the following exceptions:

In contrast to the embodiment shown in FIG. 5, the filter module 10" comprises inlet channels 24' which extend down to the inner peripheral surface 14 where they are closed by a fluid impervious portion of closure element 35, which optionally may function as a support member and have the form of a hollow, perforated shaft. Perforations 27 of the sheet or closure member 35 register with openings 26 of the sheet material being part of the outlet channels 28. The sheet material used for forming filter module 10" does not have an end portion 38 where openings 22' contributing to the inlet channels are missing as it is the case in the embodiment of FIG. 5.

Likewise, in contrast to the embodiment of FIG. 5, the sheet material used to form the filter module 10" does not have and end portion 40 where openings contributing to outlet channels 28 are missing.

The closure of the outlet channels 28 on the outer peripheral surface 16 of body 12 is provided by a closure element which optionally may function as compression means (strip like element 46).

Preferably, also in case of filter module 10", end portions of the sheet material have a tapered configuration as shown in FIG. 5 (reference numerals 42 and 44).

It is well understood that the afore-described alternative closure of the inlet and outlet channels on the inner and outer peripheral surfaces 14, 16 of the body 12 may also be put into practice with any other channel configuration within the scope of the present invention.

Another aspect of the present invention is shown in FIG. 6 in the form of a partial cut out of a body 132 of a filter module 130. The body 132 comprises a spirally wound sheet material 134 which is provided with openings 136 forming inlet channels 138 which are separated by stays 140 in the longitudinal direction of the sheet material 134. In the example shown in FIG. 6, the openings 136 are relatively large and of rectangular configuration. In view of the size of the openings, especially their extension in the direction of the longitudinal axis of the sheet material 134, it is conceivable that the stays 140 meet the corresponding stay of the adjacent layer of sheet material 134 is of no concern for the present invention. For simplicity reasons the sheet material around the openings 136 forming the inlet channels 138 is shown with a unitary thickness only. However, it is easily conceivable that the enlarged surface area provided by reduced thickness of she sheet material in areas at the edges of the openings 136 will give rise to an enlarged surface to be coated with the porous layer 146.

The stays 140 mainly serve to stabilize the structure of the body 132 and they serve this purpose irrespective of whether they meet with stays of adjacent layers of sheet material 134 or not.

Furthermore, the sheet material 134 comprises rows of openings 142 forming outlet channels 144. The special aspect of the embodiment shown in FIG. 6 is that the surface of the inlet channels 138 are covered by a porous layer 146 on the surface portions of the inlet channels 138 facing the outlet channels 144.

This porous layer may be deposited by a precoat process, a body feed process, or some combination of the two. It may also contain matter filtered from the process fluid during a body feed process. Any such layer containing material specifically added by a precoat or body feed process is usually called a precoat layer or simply a precoat. The process of creating a precoat is often called precoating.

One example of a body feed process is to start the process of filtering the fluid product and then inject into the flow, through a mixing valve upstream of the filter, a continuous supply of filter aid powder mixed with water (or other appropriate fluid). The volume flow rate of the mixture of water and powder would typically be small compared to the volume flow rate of the process fluid. A precoat process that is not a body feed can be accomplished similarly. For example, the supply of filter aid powder mixed with water can be fed through the filter system before the process fluid is introduced into the system. Once a sufficiently thick precoat is achieved in the filter channels, the feed of filter aid mixed with water is stopped and the filtration of process fluid is begun.

The precoat of the inlet channels 138 may be constituted of various materials depending on the specific treatment or filtration application and may include filter aid, reactive agents, treatment material, absorptive or adsorptive matter or other components.

Particularly preferred is a particulate material for the components constituting the precoat layers 146 and specific examples for such components are kieselguhr, perlite, bentonite, activated carbon, zeolite, micro crystalline cellulose and PVPP.

Precoating of the inlet channels 138 provides for a versatile means to adapt the properties of the body 132 to various treatment and/or filtration tasks.

Treatment of fluid may be performed by a filter module 130 taking advantage of the filtration characteristic of the body 132 or not.

The combined filtration characteristics of the filter media and the precoat depend on many factors including the nature of the process fluid and the flow, pressure and temperature specifications of the filtration process. Of particular relevance to the present invention, the filtration characteristics are affected by the thickness of the precoat and what the remaining size of the openings 136 are after accounting for the precoat thickness. In many processes, optimal performance is obtained when the precoat remains thin compared to the size of the openings 136. However, depending on the porosity and other characteristics of the precoat, an optimal process may be to completely or nearly completely fill the openings 136.

Yet another aspect of the present invention is shown in FIG. 7.

As has been explained in connection with the description of the embodiment shown in FIG. 1 already, the passage 18 is extending through the filter body 12 from one end face 48 to the other.

In order to accommodate the body of the filter module 10 within a housing, especially in a pre-existing housing or in a pre-existing filter assembly, it is necessary to provide an adaptation of the passage 18 to the (pre-existing) environment. An option for such adaptation is shown in FIG. 7. According to the proposal shown in FIG. 7, end pieces 150 sealingly engage the end faces 48 of the body 12 in their central portion. The end pieces, at least one of which comprising an opening to provide an access to passage 18 also engage, as shown in FIG. 7, the support member 32, if present.

While the end pieces 150 may comprise a sealing element, it is preferred as shown in FIG. 7 to provide the end pieces with sealing flanges 152, 154 projecting from their front faces directed to the end faces 48 of the body 12.

The flanges 152 and 154 preferably have the conical shape as shown in FIG. 7 in their cross-section which enables them to protrude into the edges of layers of sheet material 13 which consequently is compressed creating a higher flow resistance to fluid to be treated or filtered.

The innermost protrusion 154 is preferably designed larger than the protrusion 152.

The support member 32 shows a tapered portion 33 so as to provide some space for the sheet material 13 forming the innermost layer 13a to yield upon protrusion of flange 154 into its edge.

When a support member 32 is used to define the passage 18, as it is the case in FIG. 7, such support member has on its end portions adjacent to end faces 48 of body 12 angular protrusions 160 which ensure that the sheet material 13 is hold in place with respect to the support member 32 when the end pieces 150 are mounted on the end faces 48 of the body 12 and the protruding flanges 152 and 154 enter the edge of the layers of sheet material 13 while compressing same.

A still further aspect of the present invention is shown in FIG. 8.

FIG. 8 gives a schematic representation of the manufacturing process for the filter modules described above.

The process according to the present invention is described in the following for a cellulosic filter material to be used to form the body of the filter modules according to the present invention. Such cellulosic sheet material 13 is provided from a storage roll 170 and travels from that storage roll 170 to a punching machine 172, comprising a punching tool 174 for forming the openings for the inlet and outlet channels of the filter module to be created.

Preferably, as mentioned before, the punching tool 174 comprises compression elements (not shown) to allow deformation of the sheet material 13 around the areas of opening forming inlet channels and/or outlet channels as explained before in connection with, for example, FIGS. 3a to 3c. Downstream of the punching machine 172, the punched sheet material 13' is provided to a winding machine 176 which takes up the punched sheet material 13' and winds it to the final filter module. Alternatively the areas of reduced thickness at the edge of the openings forming the inlet channels could be formed in a separate step either before or after the formation of the openings.

During the winding process, it is important to ensure close contact between the adjacent layers of sheet material 13' and to apply a compression force in radial direction by a roller 178.

The compression force exerted by roller 178 is to be the radial direction as indication in FIG. 8 by arrow 180.

Preferably, the roller 178 does not create friction and the area in which the compression force 180 is applied and sensed by the sheet material 13' upon winding and the forming of the filter module should extend over an area beyond the actual contact point or contact line of roller 178 and the winding of filter module 10.

After the filter module 10 has been completed, the sheet material 13' will be cut along a line perpendicular to the travelling direction of the sheet material 13', filter module 10 will be still maintained in the compressed state, taken from the winding station 176 and compression elements will be put in place in order to maintain the body of filter module 10 in a compressed state.

The punching tool 174 is operated such as to create in the beginning of the winding process only openings for channels which are to communicate with passage 18 of filter module 10, but not such openings which are to form channels of the type which will be in communication with the outer peripheral surface of the body of the filter module 10.

This punching operation will be continued until a length of sheet material 13 has been punched which will form approximately two layers or more of the body of wound filter material of the innermost portion of the body of filter module 10.

Thereafter, the punching operation of the punching machine 172 will be switched to full operation, i.e., punching not only the openings for the channels open to the passage 18 and the inner peripheral surface of filter module 10, but also the openings for channels to open to the outer peripheral surface of filter module 10.

Near the end of the winding process, the punching operation is again changed such that only openings forming channels, which are open to the outer peripheral surface 16 of the filter module, will be produced, but openings forming channels which open to the passage 18 of filter module 10 will no longer be produced anymore.

This operation is continued for such a time that approximately two or more layers of sheet material 13' are being wound on the body of filter module 10, which only comprise the openings forming channels which open to the outer peripheral surface of the body of filter module 10.

As noted before, the end portions of the sheet material 13' may be in tapered form such that the front portion of the sheet material 13', which is wound to form the filter module 10 in the winding machine 176, will not create a step-like structure in the body of filter module 10, but will allow a smooth winding of the sheet material 13' in spiral form. Also the very end portion of the sheet material 13' which is wound on the body of filter module 10 will have a tapered section such that there is smooth surface achieved on the outer peripheral surface of the filter module 10, avoiding a stepwise structure and ensuring that the compression elements fixed on the outer peripheral surface 16 of module 10 will closely abut against all of the surface portions they are surrounding.

The compression force 180 imparted on the sheet material when wound in winding machine 176, may be adjusted in order to obtain the desired degree of compression of the body of the filter module 10.

The degree of compression is determined by the proposed application and the nature of the sheet material 13 used in this winding process.

While in connection with FIG. 8 the process of the present invention is described in connection with a step-wise punching operation of the punching machine 172, it is easily conceivable that a continuous punching operation may be performed. Of course, then the punching tool would have to look differently, but again also in such type of punching procedure, it would be possible to switch on and off individual punching tools for forming the openings for one type of channel and/or the other.

However, punching in the intermitting fashion as shown in FIG. 8 is preferred since it easily allows to provide the openings in a manner such that the openings, when wound to form a body for the filter module 10, incompletely register with one another, at least to the extent the openings of the inlet channels are concerned. The advantages achieved by such method are explained in detail in the general description of the present invention.

This would require in the punching operation as described in connection with FIG. 8 that between two strokes of the punching tool 174, the sheet material to be punched is adjusted in its position with respect to the punching tool such that adjacent openings forming the same type of channel do have a different distance in the lengthwise direction of the sheet material 13 than two adjacent openings of the same type show within one punching patter produced in one punching operation of the punching tool 174. The distance may be larger or smaller, but the effect when the punched sheet material 13' is wound to form the body of the filter module 10 will result in an incomplete registering of the openings as is shown best in FIG. 5.

The invention claimed is:

1. A filter module comprising a body of wound layers of a depth filter sheet material maintained in a compressed state, said body having an inner peripheral surface and an outer peripheral surface, a winding axis and a passage extending along the winding axis of said body and in fluid communication with said inner peripheral surface,
   said sheet material having a plurality of openings formed therein, said openings forming two types of channels within the wound layers of sheet material of said body,
   said channels extending in a direction from the inner peripheral surface to the outer peripheral surface,
   a first type of channels being open at one end at said outer peripheral surface of the body and closed at the other end located adjacent to said inner peripheral surface,
   a second type of channels being open at one end at said inner peripheral surface of the body, in fluid communication with said passage and closed at the other end located adjacent to said outer peripheral surface,
   said channels of the one type being separated from the channels of the other type by portions of sheet material,
   one of said types of channels being inlet channels communicating with a fluid inlet of said filter module, the other of said types of channels being outlet channels communicating with an outlet of said filter module,
   wherein the sheet material has areas at edges of the openings forming the inlet channels, the thickness of the areas being smaller than the thickness of the sheet material remote from the openings forming the inlet channels, wherein the areas of smaller thickness extend to adjacent openings of the same type, the areas of reduced thickness forming continuous channels allowing fluid flow therethrough and forming one or more flow paths extending along the winding direction of the sheet material, the areas of reduced thickness also allowing fluid to directly contact the areas of reduced thickness at a surface of the sheet material, and pass through the sheet material.

2. The filter module of claim 1, wherein the areas of sheet material of smaller thickness at the edges of the openings forming the inlet channels are compressed to a predefined thickness.

3. The filter module of claim 1, wherein the areas of smaller thickness of the sheet material radially extend to openings forming the outlet channels.

4. The filter module of claim 1, wherein a first strip-like element of a macro-porous material is co-wound with the sheet material to cover the openings of the sheet material forming inlet channels.

5. The filter module of claim 4, wherein the macro-porous material is essentially incompressible.

6. The filter module of claim 4, wherein the first strip-like element has the form of a band having a wedge-shaped cross-section.

7. The filter module of claim 1, wherein both sides of the sheet material are compressed while winding the layers to form the wound layers.

8. The filter module of claim 1, wherein a second strip-like element is co-wound with the sheet material to cover the openings of the sheet material forming the outlet channels, said strip-like element having openings to essentially register with the openings of the sheet material.

9. The filter module of claim 8, wherein the second strip-like element is made of a non-porous material.

10. The filter module of claim 8, wherein the second strip-like element has the form of a band having a wedge-shaped cross-section.

11. The filter module of claim 1, wherein a majority of the openings forming the inlet channels incompletely register with corresponding openings of an adjacent layer of sheet material.

12. The filter module of claim 11, wherein the incomplete registering of the openings corresponds in the average to an overlap of the openings of about 90% or less.

13. The filter module of claim 11, wherein the incomplete registering of the openings corresponds, in an average, to an overlap of about 50% or more.

14. The filter module of any one of claim 11, wherein at least about 75% of the openings forming the inlet channels incompletely overlap with the corresponding openings of an adjacent layer.

15. The filter module of claim 1, wherein said openings are separated from one another by stays of sheet material.

16. The filter module of claim 15, wherein the openings forming the inlet channels have an extension in a winding direction of the sheet material longer than an extension of the stays separating these openings from one another in the same direction.

17. The filter module of claim 1, having more openings forming inlet channels than openings forming outlet channels.

18. The filter module of claim 1 having more inlet channels than outlet channels.

19. A filter module comprising a body of wound layers of a depth filter sheet material maintained in a compressed state, said body having an inner peripheral surface and an outer peripheral surface, a winding axis and a passage extending along the winding axis of said body and in fluid communication with said inner peripheral surface,
   said sheet material having a plurality of openings formed therein, said openings forming two types of channels within the wound layers of sheet material of said body,
   said channels extending in a direction from the inner peripheral surface to the outer peripheral surface,
   a first type of channels being open at one end at said outer peripheral surface of the body and closed at the other end located adjacent to said inner peripheral surface,
   a second type of channels being open at one end at said inner peripheral surface of the body, in fluid communication with said passage and closed at the other end located adjacent to said outer peripheral surface,
   said channels of the one type being separated from the channels of the other type by portions of sheet material,
   one of said types of channels being inlet channels communicating with a fluid inlet of said filter module, the other of said types of channels being outlet channels communicating with an outlet of said filter module, the filter module having twofold or more inlet channels as compared to outlet channels, wherein the sheet material has areas at an edge of the openings forming the inlet channels, the thickness of the areas being smaller than the thickness of the sheet material remote from the openings forming the inlet channels, wherein the areas of smaller thickness extend to adjacent openings of the same type, the areas allowing fluid flow therethrough and forming one or more flow paths extending along the winding direction of the sheet material.

20. The filter module of claim 1, wherein the openings in the sheet material for each type of channels are arranged in parallel rows.

21. A filter module comprising a body of wound layers of a depth filter sheet material maintained in a compressed state, said body having an inner peripheral surface and an outer peripheral surface, a winding axis and a passage extending along the winding axis of said body and in fluid communication with said inner peripheral surface,
said sheet material having a plurality of openings formed therein, said openings forming two types of channels within the wound layers of sheet material of said body,
said channels extending in a direction from the inner peripheral surface to the outer peripheral surface,
a first type of channels being open at one end at said outer peripheral surface of the body and closed at the other end located adjacent to said inner peripheral surface,
a second type of channels being open at one end at said inner peripheral surface of the body, in fluid communication with said passage and closed at the other end located adjacent to said outer peripheral surface,
said channels of the one type being separated from the other type by portions of sheet material,
wherein the openings for one type channel are arranged in groups of two or more adjacent rows, and the openings for the other type of channel are arranged in a lesser number of rows and wherein the openings in the sheet material for each type of channels are arranged in parallel rows,
one of said types of channels being inlet channels communicating with a fluid inlet of said filter module, the other of said types of channels being outlet channels communicating with an outlet of said filter module,
wherein the sheet material has areas at an edge of the openings forming the inlet channels, the thickness of the areas being smaller than the thickness of the sheet material remote from the openings forming the inlet channels, wherein the areas of smaller thickness extend to adjacent openings of the same type, the areas allowing fluid flow therethrough and forming one or more flow paths extending along the winding direction of the sheet material.

22. A filter module comprising a body of wound layers of a depth filter sheet material maintained in a compressed state, said body having an inner peripheral surface and an outer peripheral surface, a winding axis and a passage extending along the winding axis of said body and in fluid communication with said inner peripheral surface,
said sheet material having a plurality of openings formed therein, said openings forming two types of channels within the wound layers of sheet material of said body,
said channels extending in a direction from the inner peripheral surface to the outer peripheral surface,
a first type of channels at one end at said outer peripheral surface of the body and closed at the other end located adjacent to said inner peripheral surface,
a second type of channels being pen at one end at said inner peripheral surface of the body, in fluid communication with said passage and closed at the other end located adjacent to said outer peripheral surface,
said channels of the one type being separated from the channels of the other type by portions of sheet material,
one of said types of channels being inlet channels communicating with a fluid inlet of said filter module, the other of said types of channels being outlet channels communicating with an outlet of said filter module, wherein the openings forming the inlet channels are arranged in a predefined pattern, said pattern being repeated multiple times along the winding direction of the sheet material such that the distance between openings of the same kind belonging to one pattern is different from the distance of adjacent openings of the same kind belonging to different patterns, and
wherein the sheet material has areas at an edge of the openings forming the inlet channels, the thickness of the areas being smaller than the thickness of the sheet material remote from the openings forming the inlet channels, wherein the areas of smaller thickness extend to adjacent openings of the same type, the areas allowing fluid flow therethrough and forming one or more flow paths extending along the winding direction of the sheet material.

23. The filter module of claim 1, wherein the compression of the sheet material is such that the thickness of the compiled layers of the body amounts to 99% or less of the thickness of same number of individual layers of sheet material.

24. The filter module of claim 23, wherein the thickness of the compiled layers of the body amounts to about 20% to 99% of the thickness of the same number of individual layers of sheet material.

25. The filter module of claim 24, wherein the thickness of the compiled layers amounts to about 97% to about 85%.

26. The filter module of claim 1, wherein the innermost and/or the outermost layers of sheet material are compressed at least to the extent the body is compressed.

27. The filter module of claim 26, wherein the two innermost and/or the two outermost layers are compressed to an extent substantially corresponding to the degree of compression of the body.

28. The filter module of claim 1, wherein the sheet material comprises a matrix including a compressible material and/or a material which swells in contact with the fluid to be filtered.

29. The filter module of claim 19, wherein the sheet material comprises a matrix incorporating an additive.

30. The filter module of claim 29, wherein the additive is present in an amount of up to about 70% by weight, based on the weight of the sheet material.

31. The filter module of claim 29, wherein the additive comprises an essentially incompressible particulate component, while the matrix of the sheet material includes a compressible material and/or a material which swells in contact with the fluid to be filtered.

32. The filter module of claim 29, wherein the additive comprises a porous particulate additive.

33. The filter module of claim 29, wherein the additive comprises a filter aid.

34. The filter module of claim 29, wherein the additive comprises a treatment agent.

35. The filter module of claim 29, wherein the additive comprises a reactive agent.

36. The filter module of claim 29, wherein the additive comprises an absorptive or adsorptive agent.

37. The filter module of claim 29, wherein the additive is selected from kieselguhr, perlite, bentonite, activated carbon, zeolite, micro crystalline cellulose and PVPP.

38. The filter module of claim 1, wherein the sheet material comprises a matrix said matrix including an organic polymer material.

39. The filter module of claim 1, wherein the inner peripheral surface of the body is supported by a hollow support member.

40. The filter module of claim 1, further comprising a precoat, wherein at least one type of channels has a channel surface supporting the precoat.

41. The filter module of claim 1, wherein the flow path created by the areas at the edge of the openings has a surface supporting the precoat.

42. The filter module of claim 4, wherein the macro-porous strip-like element has a surface coated with a precoat.

43. The filter module of claim 1, wherein said module comprises a clamping means positioned on the outer peripheral surface of the body, said clamping means maintaining the sheet material in a compressed state.

44. The filter module of claim 1, wherein the body comprises in the vicinity of and spaced apart from its both end faces, a plurality of outlet channels.

45. The filter module of claim 1, wherein the openings forming the outlet channels are arranged in disc-like areas of the body, said disc-like areas not comprising openings forming inlet channels.

46. The filter module of claim 1, wherein the sheet material comprises a unitary tape having a first end portion and a second end portion, wherein at least one of the end portions of the tape has a smaller thickness than portions of the tape in between the first and second end portions.

47. The filter module of claim 46, wherein at least one of the first and second end portions of the tape has a tapering cross-section in the lengthwise direction of the tape.

48. The filter module of claim 39, wherein the hollow support member provides a closure for the first type of channels at the inner peripheral surface.

49. The filter module of claim 43, wherein the clamping means provides a closure for the second type of channels at the outer peripheral surface.

50. The filter module of claim 19, wherein the areas of sheet material of smaller thickness at the edge of the openings forming the inlet channels are compressed to a predefined thickness.

51. The filter module of claim 19, wherein the areas of smaller thickness of the sheet material radially extend to openings forming the outlet channels.

52. The filter module of claim 19, wherein both sides of the sheet material are compressed while winding the layers to form the wound layers.

53. The filter module of claim 19, wherein a majority of the openings forming the inlet channels incompletely register with corresponding openings of an adjacent layer of sheet material.

54. The filter module of claim 19, wherein said openings are separated from one another by stays of sheet material.

55. The filter module of claim 54, wherein the openings forming the inlet channels have an extension in a winding direction of the sheet material longer than an extension of the stays separating these openings from one another in the same direction.

56. The filter module of claim 19, wherein the sheet material comprises a matrix including a compressible material and/or a material which swells in contact with the fluid to be filtered.

57. The filter module of claim 19, wherein the inner peripheral surface of the body is supported by a hollow support member.

58. The filter module of claim 19, wherein said module comprises a clamping means positioned on the outer peripheral surface of the body, said clamping means maintaining the sheet material in a compressed state.

59. The filter module of claim 19, wherein the body comprises in the vicinity of and spaced apart from its both end faces, a plurality of outlet channels.

60. The filter module of claim 19, wherein the sheet material comprises a unitary tape having a first end portion and a second end portion, wherein at least one of the end portions of the tape has a smaller thickness than portions of the tape in between the first and second end portions.

61. The filter module of claim 21, wherein the areas of sheet material of smaller thickness at the edge of the openings forming the inlet channels are compressed to a predefined thickness.

62. The filter module of claim 21, wherein the areas of smaller thickness of the sheet material radially extend to openings forming the outlet channels.

63. The filter module of claim 21, wherein both sides of the sheet material are compressed while winding the layers to form the wound layers.

64. The filter module of claim 21, wherein a majority of the openings forming the inlet channels incompletely register with corresponding openings of an adjacent layer of sheet material.

65. The filter module of claim 21, wherein said openings are separated from one another by stays of sheet material.

66. The filter module of claim 65, wherein the openings forming the inlet channels have an extension in a winding direction of the sheet material longer than an extension of the stays separating these openings from one another in the same direction.

67. The filter module of claim 21, wherein the sheet material comprises a matrix including a compressible material and/or a material which swells in contact with the fluid to be filtered.

68. The filter module of claim 21, wherein the inner peripheral surface of the body is supported by a hollow support member.

69. The filter module of claim 21, wherein said module comprises a clamping means positioned on the outer peripheral surface of the body, said clamping means maintaining the sheet material in a compressed state.

70. The filter module of claim 21, wherein the body comprises in the vicinity of and spaced apart from its both end faces, a plurality of outlet channels.

71. The filter module of claim 21, wherein the sheet material comprises a unitary tape having a first end portion and a second end portion, wherein at least one of the end portions of the tape has a smaller thickness than portions of the tape in between the first and second end portions.

\* \* \* \* \*